United States Patent
Shiozawa et al.

(10) Patent No.: US 7,753,162 B2
(45) Date of Patent: Jul. 13, 2010

(54) VEHICLE STEERING APPARATUS AND VEHICLE STEERING METHOD

(75) Inventors: Yuuki Shiozawa, Yokosuka (JP); Hiroshi Mouri, Yokohama (JP); Masahiro Kubota, Yokohama (JP); Ryota Shirato, Yokohama (JP); Nami Nagae, Yokohama (JP); Masayuki Watanabe, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 731 days.

(21) Appl. No.: 11/492,193

(22) Filed: Jul. 25, 2006

(65) Prior Publication Data

US 2007/0029129 A1 Feb. 8, 2007

(30) Foreign Application Priority Data

Aug. 2, 2005 (JP) ............................. 2005-223554
Mar. 3, 2006 (JP) ............................. 2006-058454

(51) Int. Cl.
*B62D 5/04* (2006.01)
(52) U.S. Cl. ...................................... 180/446; 180/443
(58) Field of Classification Search ................. 180/446
See application file for complete search history.

(56) References Cited

U.S. PATENT DOCUMENTS

| | | | | |
|---|---|---|---|---|
| 6,053,270 A * | 4/2000 | Nishikawa et al. | .......... | 180/168 |
| 7,144,346 B2 * | 12/2006 | Hermann et al. | .............. | 475/19 |
| 7,308,964 B2 * | 12/2007 | Hara et al. | ................... | 180/446 |
| 7,401,677 B2 * | 7/2008 | Boyle et al. | ................. | 180/444 |
| 2005/0236894 A1 * | 10/2005 | Lu et al. | ...................... | 303/139 |
| 2008/0033613 A1 * | 2/2008 | Tamaizumi et al. | ........... | 701/41 |
| 2008/0189012 A1 * | 8/2008 | Kaufmann | ................... | 701/41 |
| 2009/0095564 A1 * | 4/2009 | Tashiro | ........................ | 180/443 |
| 2009/0095565 A1 * | 4/2009 | Tashiro | ........................ | 180/446 |
| 2009/0125187 A1 * | 5/2009 | Yamamoto et al. | ............ | 701/42 |

FOREIGN PATENT DOCUMENTS

JP 2000-313349 11/2000
JP 2001-001923 1/2001

* cited by examiner

*Primary Examiner*—Lesley Morris
*Assistant Examiner*—Tashiana Adams
(74) *Attorney, Agent, or Firm*—Global IP Counselors, LLP

(57) ABSTRACT

A vehicle steering apparatus includes a vehicle steering system and a supplemental steering force applying device. The supplemental steering force applying device is configured and arranged to apply a supplemental steering force to the vehicle steering system to reduce a steering load on the operator. The supplemental steering force applying device includes a steering torque detecting section, a rectilinear driving condition detecting section, a pulling suppression control section. The rectilinear driving condition detecting section is configured and arranged to detect a rectilinear driving condition of the vehicle. The pulling suppression control section is configured and arranged to adjust the supplemental steering force in a direction canceling a pulling force imparted on the vehicle during the rectilinear driving condition by using a pulling suppression force calculated based on historical data of the steering torque detected during the rectilinear driving condition.

24 Claims, 21 Drawing Sheets

VEHICLE STEERING APPARATUS AND VEHICLE STEERING METHOD

CROSS-REFERENCE TO RELATED APPLICATIONS

This application claims priority under 35 U.S.C. §119 to Japanese Patent Application Nos. 2005-223554 and 2006-058454. The entire disclosures of Japanese Patent Application Nos. 2005-223554 and 2006-058454 are hereby incorporated herein by reference.

BACKGROUND OF THE INVENTION

1. Field of the Invention

The present invention relates to a vehicle steering apparatus and a vehicle steering method configured and arranged to control a supplemental steering force to reduce a steering load on a driver.

2. Background Information

Japanese Laid-Open Patent Publication No. 2001-1923 discloses an example of conventional vehicle steering apparatus that is configured and arranged to estimate various inputs such as crosswinds, road cant, and poor road conditions as dynamic disturbances, and to control a supplemental steering force so as to compensate for the estimated disturbances. Moreover, Japanese Laid-Open Patent Publication 2000-313349 discloses another example of conventional vehicle steering apparatus that is configured and arranged to calculate torque amount generated by pulling and/or shimmying of the vehicle and to suppress the pulling and/or shimmying by controlling an actuator to apply a friction force corresponding to the calculated torque amount on the vehicle.

In view of the above, it will be apparent to those skilled in the art from this disclosure that there exists a need for an improved vehicle steering apparatus and an improved vehicle steering method. This invention addresses this need in the art as well as other needs, which will become apparent to those skilled in the art from this disclosure.

SUMMARY OF THE INVENTION

It has been discovered that in conventional vehicle steering apparatuses in which the supplemental steering force is controlled so as to compensate for the estimated disturbances such as in the first reference mentioned above, the system tends to be complex since the conventional vehicle steering apparatus attempts to suppress pulling of the vehicle without taking into account that the disturbances include routine or constant disturbances (e.g., the disturbances originating in the vehicle generated by lateral differences in suspension geometry and/or lateral differences in tire conicity and the like) and temporary disturbances such as crosswinds and the like. Therefore, it is difficult to achieve optimum assist characteristics of the steering torque on the driver with the conventional vehicle steering apparatus.

Moreover, in the conventional vehicle steering apparatus in which the friction force is applied to the vehicle to suppress pulling of the vehicle as in the second reference mentioned above, the friction force acts as a resistance force when the driver steers the steering wheel of the vehicle. Therefore, the steering load on the driver increases when such conventional vehicle steering apparatus is used.

Accordingly, one object of the present invention is to provide a simplified system for a vehicle steering apparatus that can stably suppress pulling of the vehicle generated in the vehicle (i.e., pulling caused by the constant disturbances) without increasing the steering load on the driver.

In order to achieve the above object of the present invention, a vehicle steering apparatus includes a vehicle steering system and a supplemental steering force applying device. The vehicle steering system includes a steering wheel configured and arranged to be operated by an operator of a vehicle and a pair of drive wheels operatively coupled to the steering wheel to selectively turn with respect to the vehicle in accordance with a steering operation of the steering wheel by the operator. The supplemental steering force applying device is configured and arranged to apply a supplemental steering force to the vehicle steering system to reduce a steering load on the operator. The supplemental steering force applying device includes a steering torque detecting section, a rectilinear driving condition detecting section, a pulling suppression control section. The steering torque detecting section is configured and arranged to detect a steering torque. The rectilinear driving condition detecting section is configured and arranged to detect a rectilinear driving condition of the vehicle. The pulling suppression control section is configured and arranged to adjust the supplemental steering force in a direction canceling a pulling force imparted on the vehicle during the rectilinear driving condition by using a pulling suppression force calculated based on historical data of the steering torque detected during the rectilinear driving condition.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
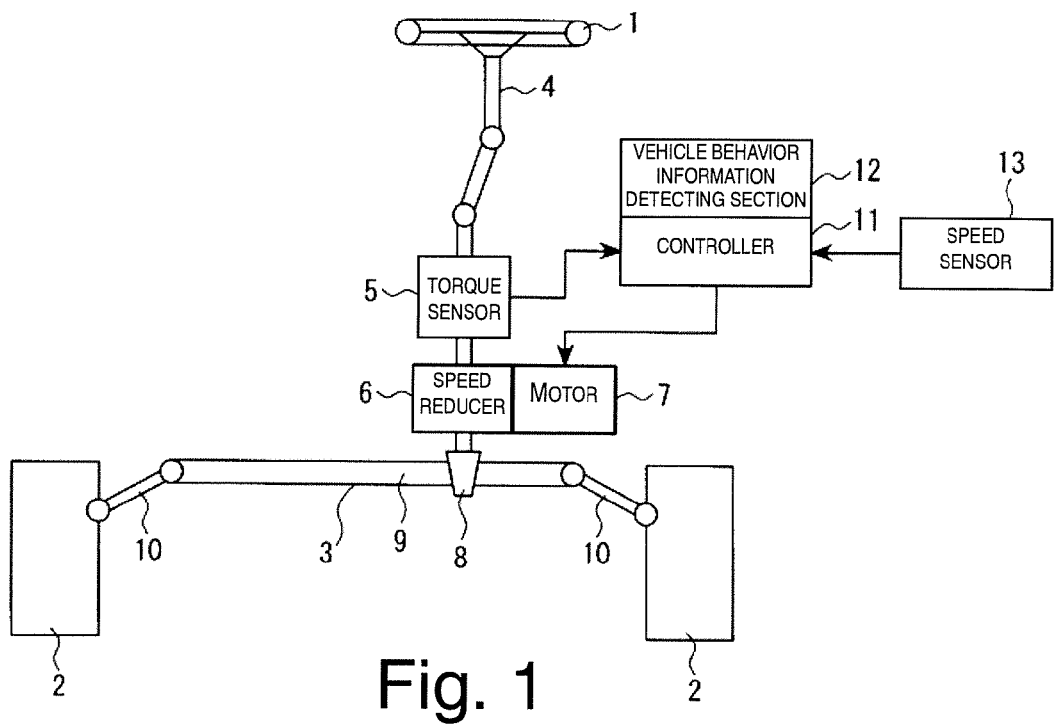
FIG. 1 is a schematic diagram of a vehicle steering apparatus in accordance with a first embodiment of the present invention.
Figure 2:
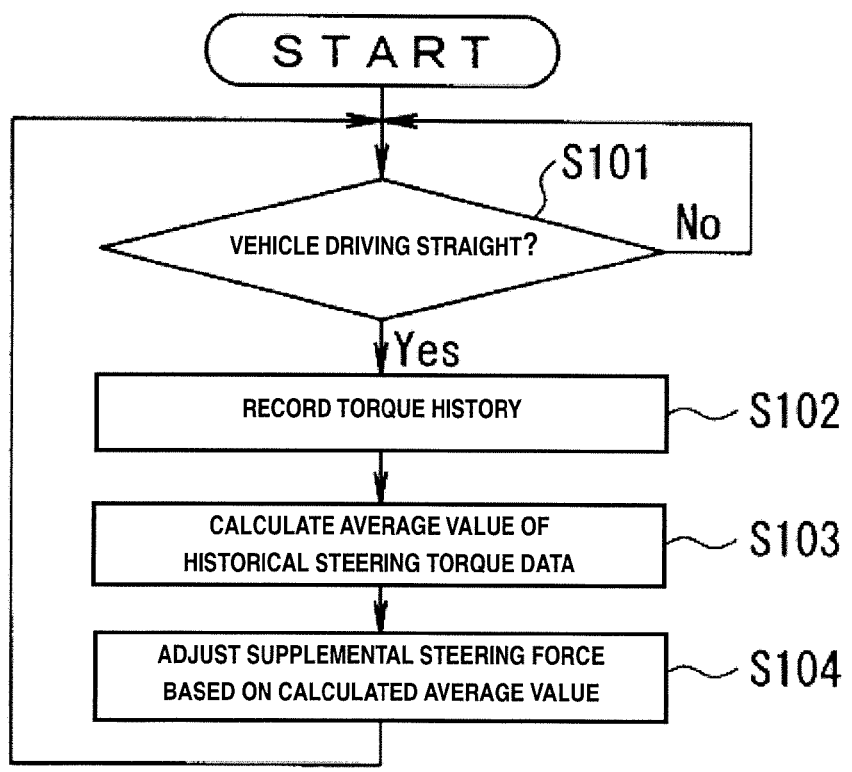
FIG. 2 is a flowchart showing a control flow of a pulling suppression control process executed by a controller of the vehicle steering apparatus in accordance with the first embodiment of the present invention.

Referring initially to FIGS. 1 and 2, a vehicle steering apparatus is illustrated in accordance with a first embodiment of the present invention.

FIG. 1 is a schematic diagram of the vehicle steering apparatus in accordance with the first embodiment. As seen in FIG. 1, the vehicle steering apparatus of the first embodiment includes a handle or steering wheel (steering input section) 1 configured and arranged to be operated by a driver, and a steering mechanism 3 configured and arranged to turn a pair of front wheels (steering control wheels) 2 in accordance with the amount of operation of the steering wheel 1.

A steering shaft (steering column) 4 is integrally coupled to the steering wheel 1. The steering shaft 4 is provided with a torque sensor 5 and a speed reducer 6 thereon, and is connected to a motor 7 via the speed reducer 6. A pinion 8 of a rack and pinion mechanism is connected to the tip of the steering shaft 4. A knuckle arm of each of the left and right front wheels 2 is connected via a tie rod 10 to a corresponding end of a rack 9. The rack 9 engages the pinion 8 and reciprocates in the vehicle widthwise direction.

A controller (pulling suppression control section) 11 is operatively coupled to the motor 7 to perform a supplemental steering force control. The controller 11 preferably includes a microcomputer with a supplemental steering force control program that controls the supplemental steering force control as discussed below. The controller 11 can also include other conventional components such as an input interface circuit, an output interface circuit, and storage devices such as a ROM (Read Only Memory) device and a RAM (Random Access Memory) device. The microcomputer of the controller 11 is programmed to control a supplemental steering force command value of the motor 7. The memory circuit stores processing results and control programs such as ones for a pulling suppression control operation that are run by the processor circuit. The controller 11 is operatively coupled to the motor 7 in a conventional manner. The internal RAM of the controller 11 stores statuses of operational flags and various control data. The internal ROM of the controller 11 stores the map data and the like for various operations. The controller 11 is capable of selectively controlling any of the components of the control system in accordance with the control program. It will be apparent to those skilled in the art from this disclosure that the precise structure and algorithms for the controller 11 can be any combination of hardware and software that will carry out the functions of the present invention. In other words, "section plus function" clauses as utilized in the specification and claims should include any structure or hardware and/or algorithm or software that can be utilized to carry out the function of the "section plus function" clause.

The controller 11 is configured to generate a supplemental steering force on the vehicle to assist the steering force of the driver based on information from the torque sensor 5, and a vehicle speed sensor 13. More specifically, the controller 11 is configured to perform a supplemental steering force control in which the motor 7 is driven according to the supplemental steering force command value corresponding to the supplemental steering force.

Moreover, the controller 11 is configured to perform a pulling suppression control independently of the supplemental steering force control. More specifically, the controller 11 is configured to save the steering torque measured by the torque sensor 5 in the memory circuit when it is determined based on information from a vehicle speed sensor 13 and a vehicle behavior information detecting section 12 that the vehicle is driving straight (i.e., the vehicle is in a rectilinear driving condition). The controller 11 is further configured to calculate an average value of the historical data of the steering torque stored in the memory circuit. This average value of the historical data of the steering torque during the vehicle is driving straight is considered as a representative value of a pulling force generated in the vehicle (e.g., the pulling force generated due to lateral differences in suspension geometry and/or lateral differences in tire conicity and the like). Therefore, the controller 11 is configured to perform the pulling suppression control, in which the calculated average value of the steering torque is set as a pulling suppression force that is a torque amount required to suppress pulling of the vehicle toward left or right during the vehicle is driving straight. The controller 11 is configured to add or subtract the pulling suppression force from the supplemental steering force command value to the motor 7 so that the pulling suppression force is imparted in a direction canceling the pulling force applied to the vehicle when the vehicle is driving straight.

FIG. 2 is a flowchart showing a control flow of the pulling suppression control process executed by the controller 11 of the first embodiment. The control process illustrated in FIG. 2 is preferably repeatedly executed at predetermined control intervals while the vehicle is moving (i.e., when the vehicle speed sensor 13 detects that the vehicle speed is not equal to zero).

In step S101, the controller 11 is configured to determine whether or not the vehicle is in the rectilinear driving condition (i.e., whether or not the vehicle is driving straight) based on the vehicle behavior information (e.g., yaw rate and the like) detected by the vehicle behavior information detecting section 12. Step S101 corresponds to a rectilinear driving detection section of the present invention. When the determination in step S101 is YES, the controller 11 proceeds to step S102. When the determination in step S101 is NO, step S101 is repeated.

In step S102, the controller 11 is configured to record the steering torque measured by the torque sensor 5 in the memory, and the controller 11 proceeds to step S103.

In step S103, the controller 11 is configured to calculate the average value of the historical data of the steering torque stored in the memory, and the controller 11 proceeds to step S104. In order to calculate the average value of the historical data of the steering torque, the historical data for a sufficiently long period of time is used so that the influences of momentary disturbances are relatively disregarded.

In step S104, the controller 11 is configured to adjust the supplemental steering force command value to the motor 7 in accordance with the average value of the historical data of the steering torque calculated in step S103. More specifically, the average value of the historical data of the steering torque is set as the pulling suppression force (pulling suppression supplemental steering force) that is a torque amount required to suppress pulling of the vehicle while the vehicle is driving straight. Thus, the pulling suppression force is added to or subtracted from the command value to the motor 7 in a direction canceling the pulling force applied to the vehicle while the vehicle is driving straight. Then, the controller 11 returns to step S101. Thus, in the first embodiment of the present invention, the average value of the historical data of the steering toque (i.e., the pulling suppression force) is calculated independently of the supplemental steering force calculated in the supplemental steering force control. When any supplemental steering force command value is calculated in the supplemental steering force control, the average value of the historical data of the steering torque is constantly added or subtracted to the supplemental steering force command value as an offset amount of the supplemental steering force command value.

In the first embodiment, a rectilinear driving condition of the vehicle is determined by the rectilinear driving condition detecting section 12, and the steering torque during rectilinear driving is measured by the torque sensor 5 and stored in the memory. The controller 11 is configured to calculate the average value of the historical data of the steering torque, and to drive the motor 7 using the average value as the torque required to suppress pulling of the vehicle (the pulling suppression force).

Figure 3:
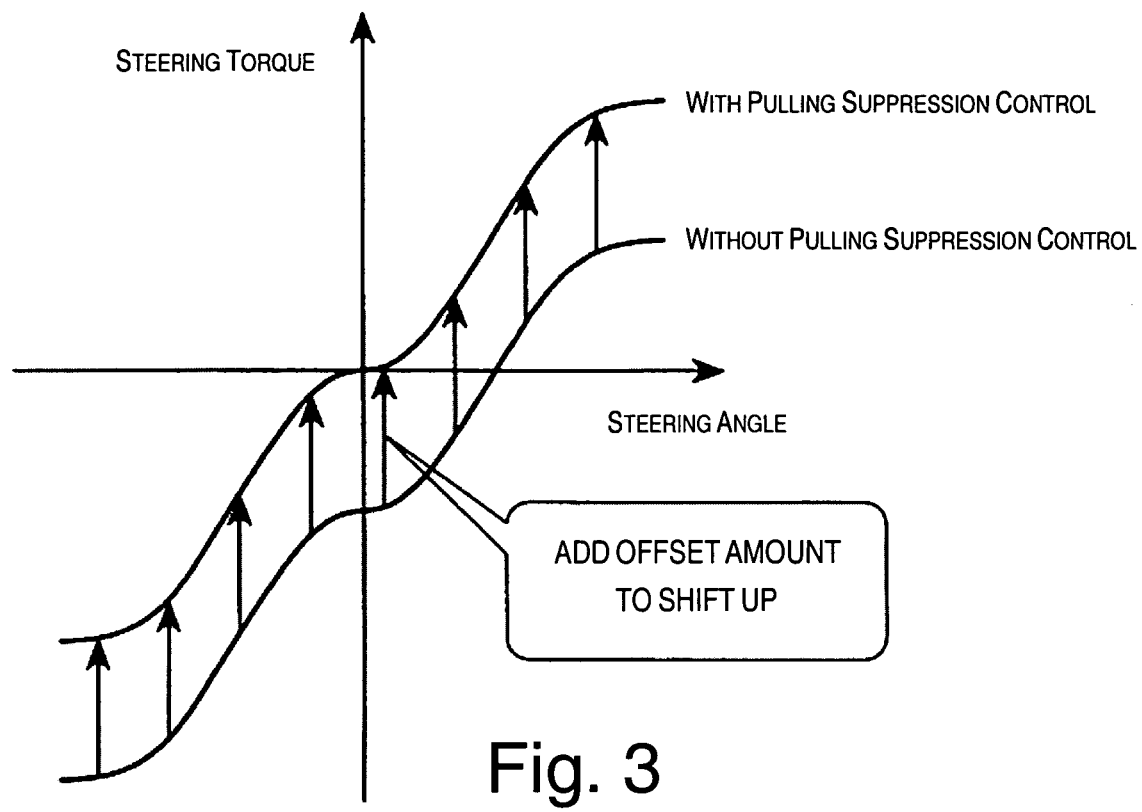
FIG. 3 is a diagram illustrating a relationship between steering angle and steering torque when the pulling suppression control is performed by the vehicle steering apparatus in accordance with the first embodiment of the present invention.

Thus, the average value of the historical data of the steering torque during the rectilinear driving condition is used as the pulling suppression torque to offset the supplemental steering force command value as shown in FIG. 3 in a direction canceling the pulling force imparted to the vehicle during the rectilinear driving condition. Thus, the torque generated by the pulling of the vehicle can be isolated and suppressed without interfering with the supplemental steering force control when the vehicle is normally pulled toward left or right during the rectilinear driving condition by the pulling force generated in the vehicle (e.g., the pulling force generated due to lateral differences in suspension geometry and/or lateral differences in tire conicity and the like).

Accordingly, the vehicle steering apparatus of the first embodiment includes the torque sensor 5 (the steering torque detecting section) configured and arranged to detect a steering torque, the rectilinear driving condition detecting section (step S101) for detecting a rectilinear driving condition of the vehicle, and the controller 11 configured to provide a pulling suppression supplemental steering force in a direction canceling the steering torque during rectilinear driving based on the steering torque historical data during rectilinear driving of the vehicle. Thus, the system of the vehicle steering apparatus is simplified and the pulling generated in the vehicle is stably suppressed by regularly controlling (as oppose to dynamic momentary corrections) the characteristics of the vehicle itself by the supplemental steering force control using a long-term historical data of the steering torque.

The controller 11 is configured to control the pulling suppression force independently of the other supplemental steering force controls, and to add (or subtract) a torque needed to suppress pulling of the vehicle (the pulling suppression supplemental steering force or the pulling suppression force) to the supplemental steering force. Thus, pulling of the vehicle can be suppressed without reducing steering sensitivity or generating erroneous steering assisting force, and without interfering with other controls even when a plurality of supplemental steering force controls are executed.

The system used in the vehicle steering apparatus of the present invention is easily applicable to vehicle steering apparatuses provided with existing general supplemental steering force control functions since the torque sensor 5 that measures a driver input steering torque disposed on the steering column is used as a steering torque detecting section.

In the vehicle steering apparatus of the present invention, the pulling suppression force is applied in a direction that cancels the steering torque (the pulling force) generated during rectilinear driving based on the historical data of the steering torque during rectilinear driving of the vehicle. Accordingly, the system of the vehicle steering apparatus is simplified and the pulling force generated in the vehicle is stably suppressed by regularly or constantly controlling (as oppose to dynamic momentary corrections) the characteristics of the vehicle itself by the pulling suppression control using a long-term historical data of the steering torque.

Although the historical data of the steering torque is collected when the rectilinear driving condition detecting section 12 determines the vehicle is in a rectilinear driving condition in the first embodiment, the steering torque may be regularly measured and a peak frequency of a frequency distribution in the historical data of the steering torque may be determined as the pulling force generated by the vehicle without using the rectilinear driving condition detecting section 12.

Second Embodiment

Referring now to FIGS. 4 to 7, a vehicle steering apparatus in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 4:
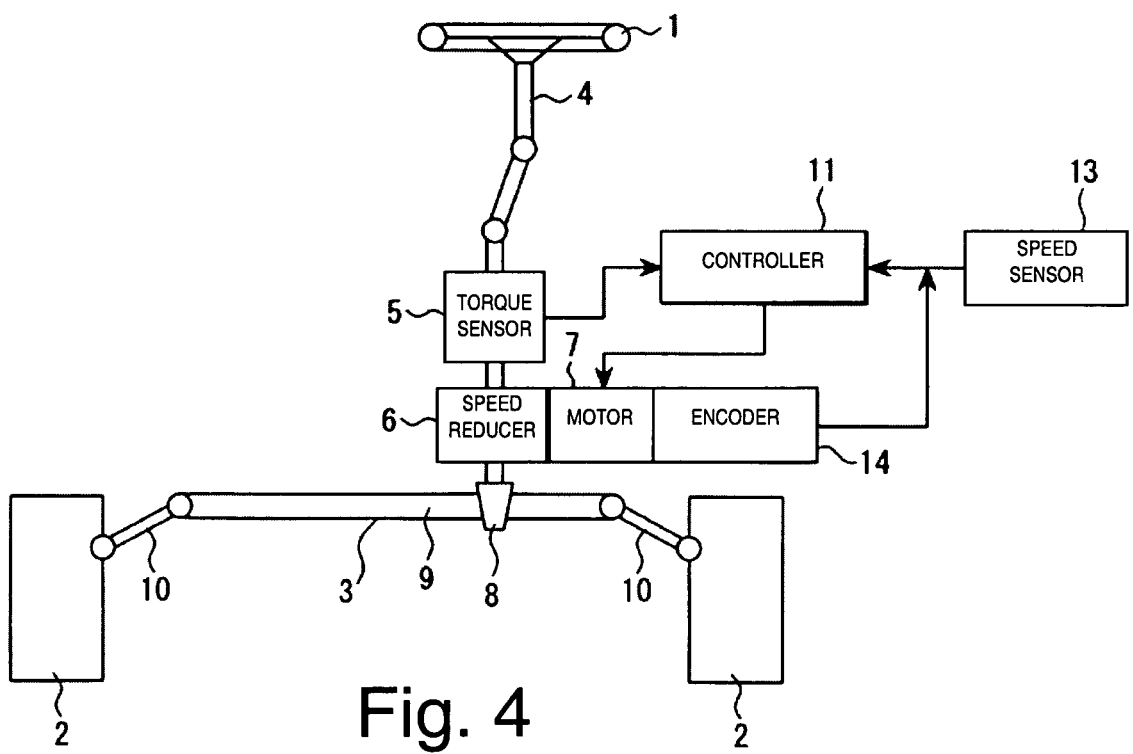
FIG. 4 is a schematic diagram of a vehicle steering apparatus in accordance with a second embodiment of the present invention.

FIG. 4 is a schematic diagram of the vehicle steering apparatus of the second embodiment. The description below focuses on explaining structural parts and operations of the second embodiment that are different from the first embodiment illustrated in FIG. 1. The vehicle steering apparatus of the second embodiment differs from the vehicle steering apparatus of the first embodiment in that the rectilinear driving condition of the vehicle is determined based on an average value of historical data of the steering angle.

As seen in FIG. 4, the vehicle steering apparatus of the second embodiment has an encoder (steering angle detecting section) 14 configured and arranged to detect the steering angle of the steering wheel 1. The encoder 14 is operatively coupled to the motor 7. The controller 11 is configured to control actuation of the motor 7, and to perform the supplemental steering force control and the pulling suppression control based on information from the vehicle speed sensor 13, the encoder 14, and the torque sensor 5.

Figure 5:
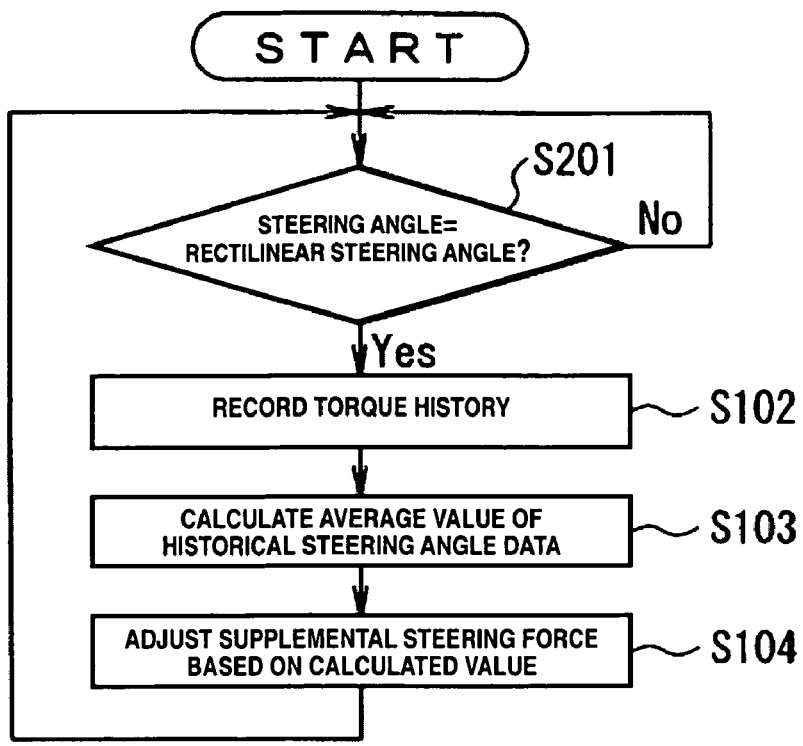
FIG. 5 is a flowchart showing a control flow of a pulling suppression control process executed by a controller of the vehicle steering apparatus in accordance with the second embodiment of the present invention.

FIG. 5 is a flowchart showing a control flow of the pulling suppression control executed by the controller 11 of the second embodiment. The control steps in which processes identical to those of the first embodiment shown in FIG. 3 are indicated by identical step numbers, and the control steps which differ from the first embodiment are designated by different step numbers.

In step S201, the controller 11 is configured to calculate a rectilinear steering angle required to maintain the rectilinear driving condition of the vehicle, and to determine whether or not the steering angle measured by the encoder 14 is the rectilinear steering angle. When the determination in step S201 is YES, the controller 11 proceeds to step S102. When the determination in step S201 is NO, step S201 is repeated.

Figure 6:
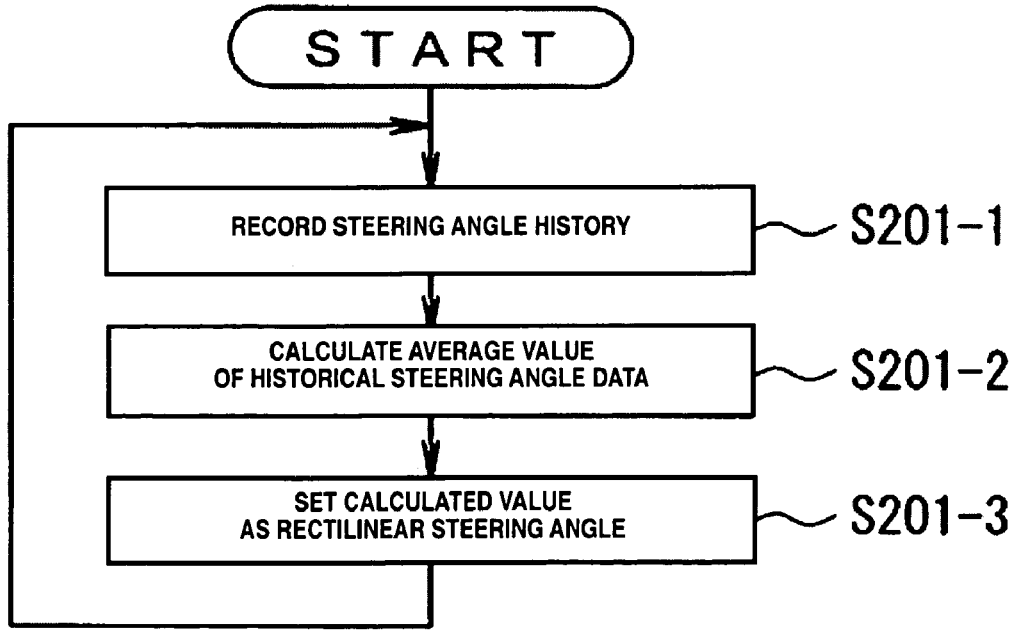
FIG. 6 is a flowchart showing a control flow of a rectilinear steering angle calculation control process executed by the controller of the vehicle steering apparatus in accordance with the second embodiment of the present invention.

FIG. 6 is a flowchart showing a control flow of the rectilinear steering angle calculation control process executed in step S201 of FIG. 5. This control process shown in FIG. 6 corresponds to the rectilinear steering angle calculating section for calculating the steering angle for maintaining the rectilinear driving condition.

In step S201-1, the controller 11 is configured to record the steering angle measured by the encoder 14 in the memory, and the controller 11 proceeds to step S201-2.

In step S201-2, the controller 11 is configured to calculate the average value of the historical data of the steering angle stored in the memory, and the controller 11 proceeds to step S201-3.

In step S201-3, the controller 11 is configured to set the average value of the historical data of the steering angle calculated in step S201-2 as the rectilinear steering angle, and the controller 11 proceeds to step S201-1.

In the second embodiment, the average value of the historical data of the steering angle is set as a predetermined steering angle (the rectilinear steering angle) to maintain the rectilinear driving condition of the vehicle. Then, a determination is made in step S201 as to whether or not the steering angle while driving matches the rectilinear steering angle. The steering torque is recorded in step S102 in the memory when the values match. Then, the average value of the historical data of the steering torque is set as the pulling suppression torque needed for maintain the rectilinear driving condition of the vehicle.

Figure 7:
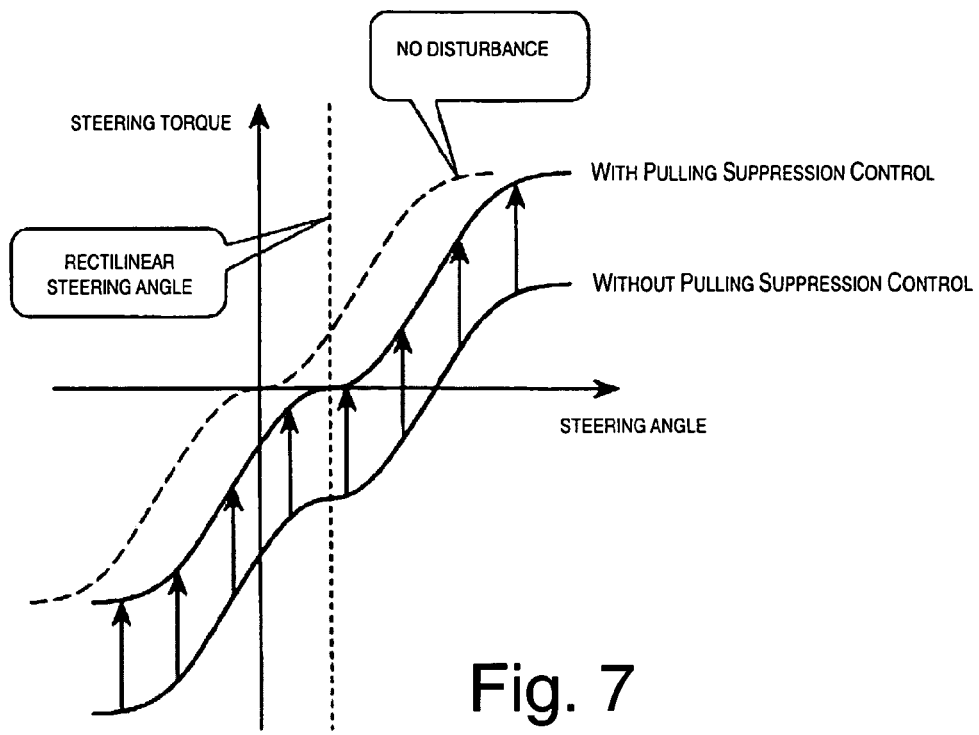
FIG. 7 is a diagram illustrating a relationship between steering angle and steering torque when the pulling suppression control is performed by the vehicle steering apparatus in accordance with the second embodiment of the present invention.

Thus, in the vehicle steering apparatus of the second embodiment, the pulling force is readily suppressed even when there is the steering neutral position and the steering neutral torque are both offset (out of alignment) as shown in FIG. 7.

Accordingly, the vehicle steering apparatus of the second embodiment includes the encoder 14 configured and arranged to detect the steering angle of the steering wheel, and a rectilinear steering angle calculating section (the control flow shown in FIG. 6) configured and arranged to calculate the rectilinear steering angle for maintaining the rectilinear driving condition. The controller 11 is configured to control the pulling suppression force so as to attain the steering torque of "0" or approach "0" at the rectilinear steering angle for maintaining the rectilinear driving condition. Thus, it is possible to correct offset amount of the neutral torque considering the offset amount of the steering neutral position by taking the steering angles into account as well as the historical data of the steering torque.

The rectilinear steering angle calculating section (the control flow shown in FIG. 6) can set the rectilinear steering angle for maintaining the rectilinear driving condition based on the average value of the historical data of the steering angle. Therefore, the rectilinear steering angle can be determined by measuring only the steering angles.

In the second embodiment, when the vehicle accurately confirmed to be in a rectilinear driving condition by fixing a neutral position of the steering as a vehicle characteristic (that is, the vehicle does not shift from a neutral steering angle even when the pulling force is imparted), the rectilinear steering angle calculation process may be omitted, and the average value of the historical data of the steering torque when the steering angle is "0" may be used as the correction torque needed to suppress pulling.

Although the steering torque at the rectilinear steering angle is detected in the second embodiment, the historical data reliability can be improved by detecting the steering torque when a prescribed steering angle is continuously detected for a prescribed period of time because momentary matches of the steering angle while turning can be eliminated.

The rectilinear driving condition of the vehicle is determined based on the average value of the historical data of the steering angle in the second embodiment. Alternatively, it is also possible to use other physical quantities, such as yaw rate and the like, instead of the steering angle.

Third Embodiment

Figure 8:
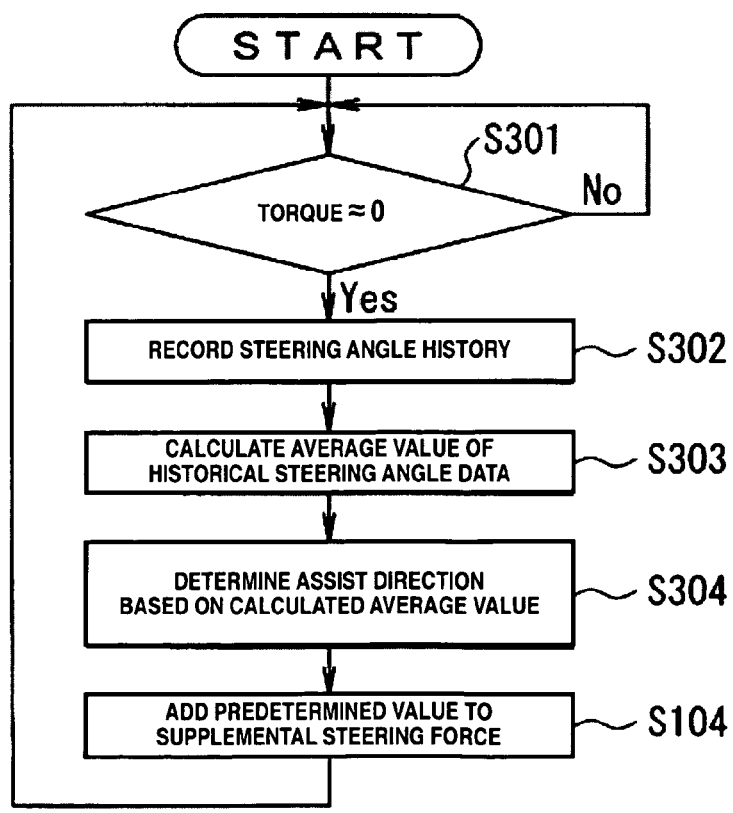
FIG. 8 is a flowchart showing a control flow of a pulling suppression control process executed by a controller of a vehicle steering apparatus in accordance with a third embodiment of the present invention.
Figure 9:
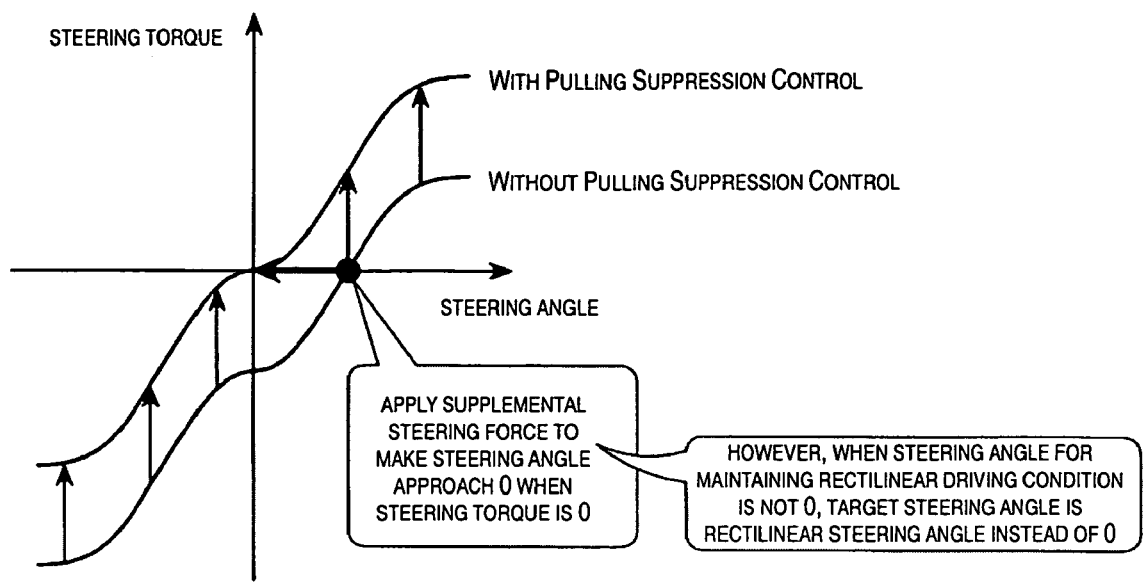
FIG. 9 is a diagram illustrating a relationship between steering angle and steering torque when the pulling suppression control is performed by the vehicle steering apparatus in accordance with the third embodiment of the present invention.

Referring now to FIGS. 8 and 9, a vehicle steering apparatus in accordance with a third embodiment will now be explained. In view of the similarity between the second and third embodiments, the parts of the third embodiment that are identical to the parts of the second embodiment will be given the same reference numerals as the parts of the second embodiment. Moreover, the descriptions of the parts of the third embodiment that are identical to the parts of the second embodiment may be omitted for the sake of brevity.

The vehicle steering apparatus of the third embodiment differs from the vehicle steering apparatus of the second embodiment in that the pulling direction of the vehicle is detected when the driver is not holding the steering wheel 1 or is not steadily holding the steering wheel 1, and the supplemental steering force is imparted in a direction suppressing pulling of the vehicle. The structure of the vehicle steering apparatus of the third embodiment is identical to that of the second embodiment shown in FIG. 4 except that the controller 11 is configured to perform the control process shown in the flowchart of FIG. 8.

FIG. 8 is the flowchart showing the control flow of the pulling suppression control process executed by the controller 11 of the third embodiment. The control steps in which processes are identical to those of the first embodiment shown in FIG. 3 are indicated by identical step numbers, and the control steps which differ from the first embodiment are designated by different step numbers In step S301, the controller 11 is configured to determine whether or not the steering torque measured by the torque sensor 5 is less than a predetermined value close to "0." When the determination in step S301 is YES, the controller 11 proceeds to step S302. When the determination in step S301 is NO, step S301 is repeated.

In step S302, the controller 11 is configured to record the steering angle measured by the encoder 14 in the memory, and the controller 11 proceeds to step S303.

In step S303, the controller 11 is configured to calculate the average value of the historical data of the steering angle recorded in the memory, and the controller 11 proceeds to step S304.

In step S304, the controller 11 is configured to determine to what degree the vehicle is veering to left or right from the average value of the historical data of the steering angle calculated in step S303. Then, the controller 11 is configured to add a predetermined supplemental steering force in a direction canceling the pulling force that causes the vehicle to veer, whereupon the controller 11 proceeds to step S301.

In the third embodiment, the direction in which the vehicle is veering is detected when the driver is not holding the steering wheel 1 or is not steadily holding the steering wheel 1 (e.g., when the steering torque is less than a predetermined value close to "0"), and the predetermined supplemental steering torque is provided to cancel the pulling force on the vehicle that cases the vehicle to veer. In the third embodiment, pulling of the. vehicle is suppressed by determining only the direction of assistance and gradually adjusting the amount of assistance without directly determining the supplemental steering torque needed to suppress pulling of the vehicle, as shown in FIG. 9.

In the third embodiment, when there is a variance between the steering angle for maintaining the rectilinear driving condition and the steering angle when the steering torque is not imparted, a predetermined offset amount is added or subtracted from the supplemental steering force in a direction that cancels the variance. The offset amount gradually increases while the variance still exists, and the increase of the offset amount stops when the steering angle for maintaining the rectilinear driving condition matches the steering angle when the steering torque is not imparted.

Accordingly, with the third embodiment, the controller 11 is configured to use the average value of the historical data of the steering angle when the steering torque is less than the predetermined value close to "0" to control the pulling suppression force in a direction approaching the rectilinear steering angle for maintaining the rectilinear driving condition. Thus, pulling of the vehicle is stably suppressed by taking the historical data of the steering angle into account even when there is no steering torque input when the driver is not holding the steering wheel 1 or is not steadily holding the steering wheel 1.

Fourth Embodiment

Figure 10:
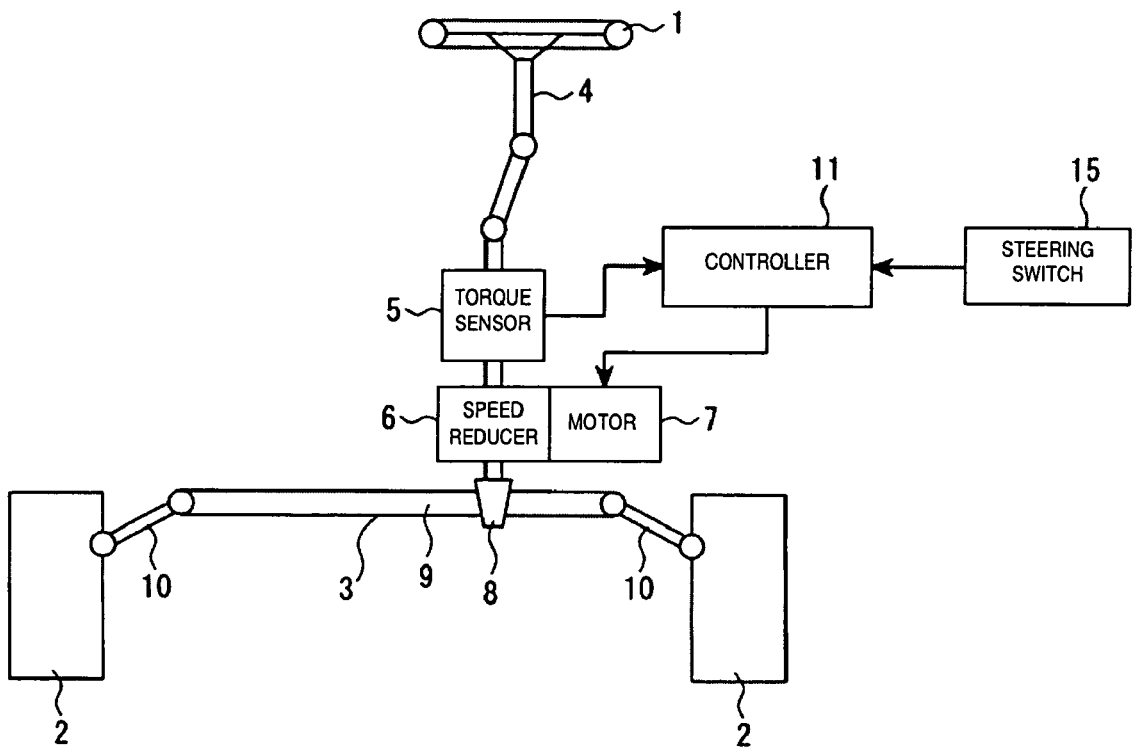
FIG. 10 is a schematic diagram of a vehicle steering apparatus in accordance with a fourth embodiment of the present invention.
Figure 11:
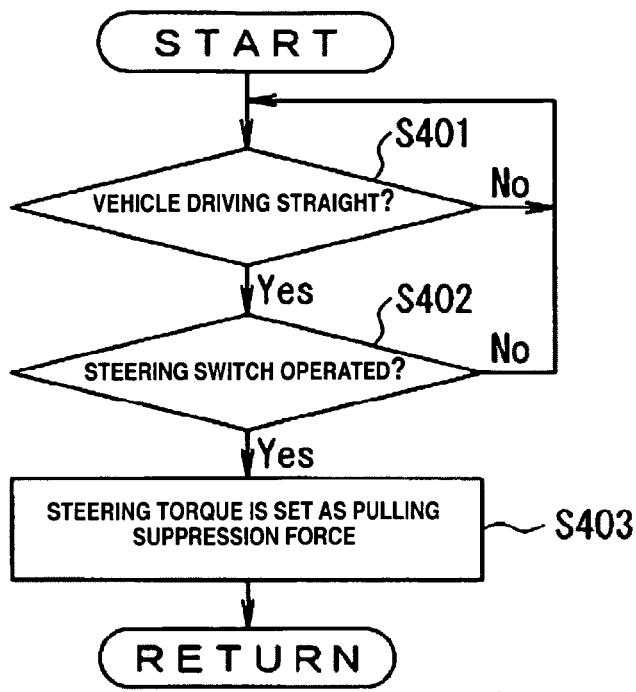
FIG. 11 is a flowchart showing a control flow of a pulling suppression control process executed by a controller of the vehicle steering apparatus in accordance with the fourth embodiment of the present invention.
Figure 12:
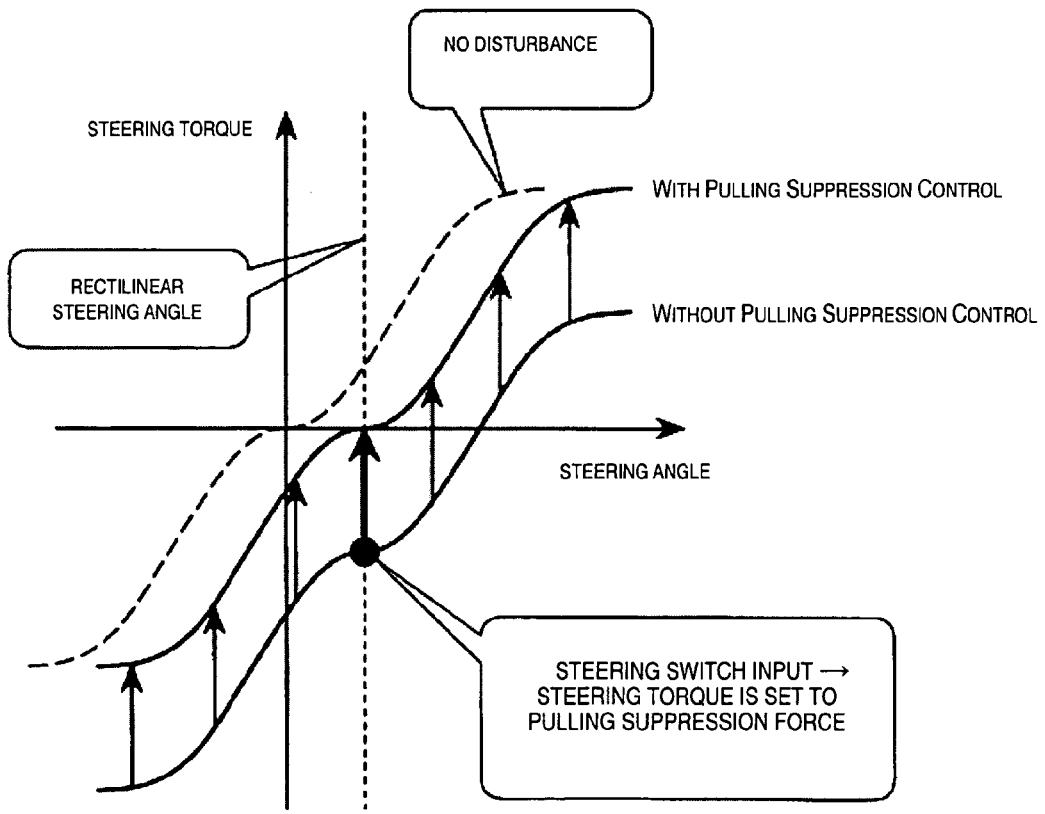
FIG. 12 is a diagram illustrating a relationship between steering angle and steering torque when the pulling suppression control is performed by the vehicle steering apparatus in accordance with the fourth embodiment of the present invention.

Referring now to FIGS. 10 to 12, a vehicle steering apparatus in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

FIG. 10 is a schematic diagram of the vehicle steering apparatus of the fourth embodiment. The description below focuses on explaining structural parts and operations of the second embodiment that are different from the first embodiment illustrated in FIG. 1. The vehicle steering apparatus of the fourth embodiment differs from the vehicle steering apparatus of the first embodiment in that a steering neutral point (a point in which a sufficient amount of torque is imparted to the steering wheel 1 so that the vehicle drives straight) is set by a steering switch operated by a vehicle operator such as the driver or a maintenance person.

As seen in FIG. 10, the vehicle steering apparatus of the fourth embodiment is provided with a steering switch 15 for setting the steering neutral point. The steering switch 15 is operated by the driver of the maintenance person when the driver or the maintenance person perceives the steering neutral position in which the vehicle drives straight. The controller 11 is configured to control the motor 7 to generate the supplemental steering force based on information from the torque sensor 5 and the steering switch 15.

FIG. 11 is a flowchart showing a control flow of the pulling suppression control process executed by the controller 11 of the fourth embodiment.

In step S401, the controller 11 is configured to determine whether or not the vehicle is in the rectilinear driving condition (i.e., whether or not the vehicle is driving straight). When the determination in step S401 is YES, the controller 11 is configured to proceed to step S402. When the determination in step S401 is NO, the controller 11 is configured to repeat step S401. Alternatively, determination of the rectilinear driving condition can also be directly made by the driver or the vehicle maintainer, in such case step S401 can be omitted.

In step S402, the controller 11 is configured to determine whether or not the steering switch 15 has been turned on. When the determination in step S402 is YES, the controller 11 is configured to proceed to step S403. When the determination in step S402 is NO, the controller 11 is configured to repeat step S401.

In step S403, the controller 11 is configured to set the steering torque measured by the torque sensor 5 when the steering switch 15 is turned on as the pulling suppression torque, and the control routine returns to step S401.

Accordingly, in the fourth embodiment, if the steering switch 15 is turned on while the vehicle is moving when there is no momentary disturbance (such as crosswinds and the like) and the vehicle is in the rectilinear driving condition, the torque acting on the steering system at the time is set as the pulling suppression force, and the pulling suppression force is regularly output to the motor 7.

As a result, as seen in FIG. 12, when the driver has been applying torque on the steering wheel 1 in order to drive straight against pulling of the vehicle, the pulling suppression force acts on the vehicle in a direction that cancels pulling of the vehicle upon the driver turning on the steering switch 15. Therefore, it is unnecessary for the driver to output extra force on the steering wheel 1 to drive straight once the steering switch 15 is turned on and the pulling suppression force is imparted on the vehicle. Furthermore, the number of processes for correcting a torque deviation from a steering neutral point is greatly reduced by setting the neutral point of the supplemental steering force by the steering switch 15 at the vehicle maintenance factory or on the vehicle production line.

Accordingly, in the fourth embodiment of the present invention, the steering switch 15 is provided for setting the steering neutral point and the steering switch 15 is operated by the driver or the maintenance person. The controller 11 is configured to set the steering torque at the time the steering switch 15 is operated as the pulling suppression force. Thus, pulling of the vehicle can be stably suppressed using the simplest structure as the control system by entrusting the detection of the rectilinear driving condition to the vehicle operator such as the driver or the maintenance person. Furthermore, the system of the vehicle steering apparatus of the fourth embodiment is applicable to all types of vehicles that have the supplemental steering force function, and can rapidly correct deviations in vehicle characteristics with just a short adjustment period on the production line, and deviation in vehicle characteristics caused after the vehicle has been purchased.

Fifth Embodiment

Figure 13:
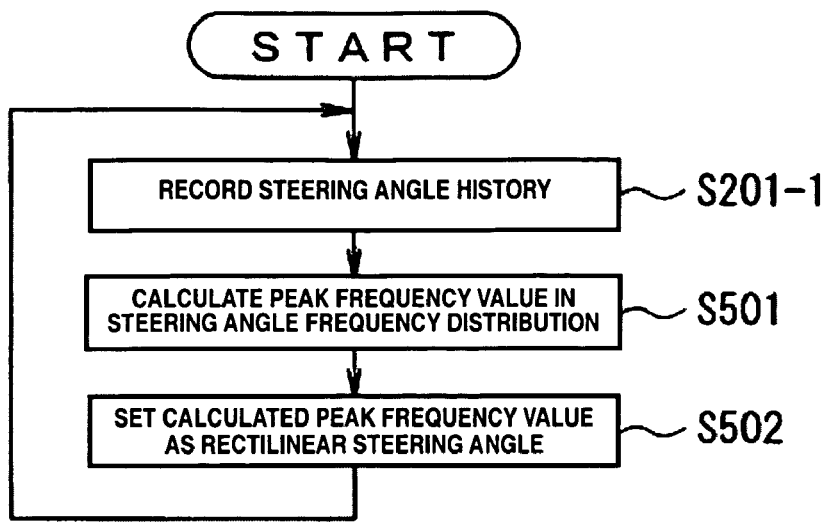
FIG. 13 is a flowchart showing a control flow of a rectilinear steering angle calculation control process executed by a controller of a vehicle steering apparatus in accordance with a fifth embodiment of the present invention.
Figure 14:
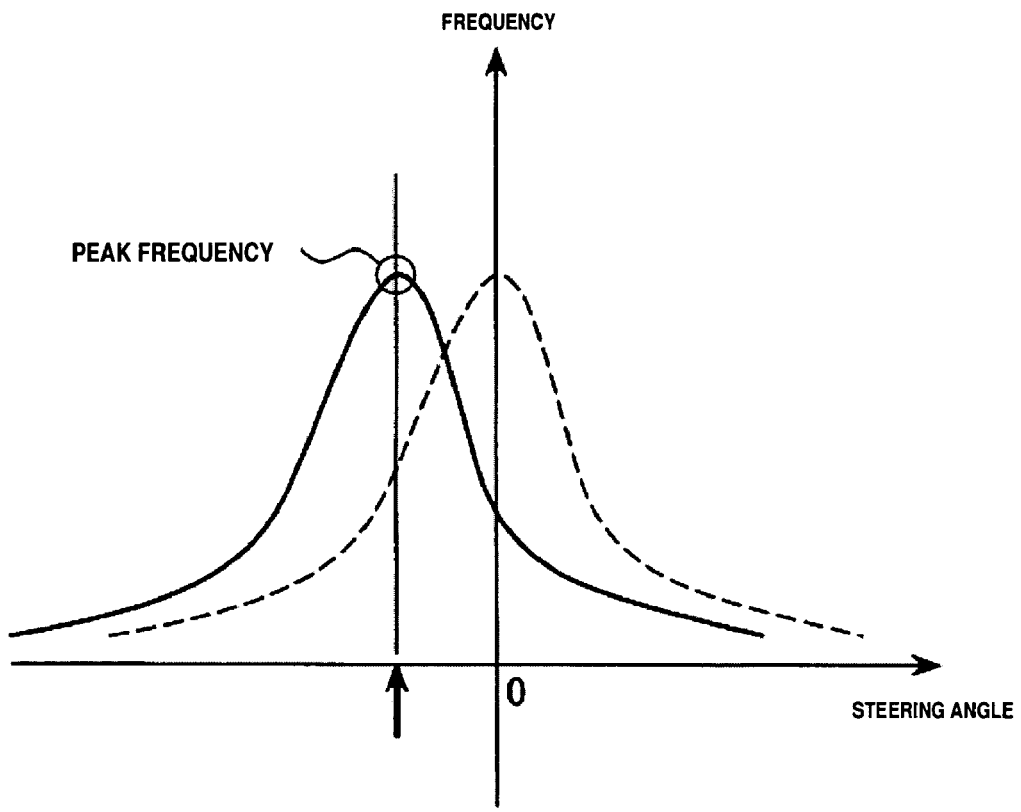
FIG. 14 is a diagram illustrating one example of a frequency distribution in historical data of the steering angle used in the vehicle steering apparatus in accordance with the fifth embodiment of the present invention.

Referring now to FIGS. 13 and 14, a vehicle steering apparatus in accordance with a fifth embodiment will now be explained. In view of the similarity between the second and fifth embodiments, the parts of the fifth embodiment that are identical to the parts of the second embodiment will be given the same reference numerals as the parts of the second embodiment. Moreover, the descriptions of the parts of the fifth embodiment that are identical to the parts of the second embodiment may be omitted for the sake of brevity.

The vehicle steering apparatus of the fifth embodiment differs from the vehicle steering apparatus of the second embodiment in that a peak distribution value in the historical data of the steering angle is set as the rectilinear steering angle. The structure of the vehicle steering apparatus of the fifth embodiment is identical to that of the second embodiment illustrated in FIG. 4 except that the controller 11 is configured to perform a control process illustrated in a flowchart of FIG. 13 instead of the control process illustrated in FIG. 6 of the second embodiment.

FIG. 13 is the flowchart showing a control flow of the rectilinear steering angle calculation control process of the fifth embodiment. The control steps in which processes are identical to those of the second embodiment shown in FIG. 6 are indicated by identical step numbers, and descriptions of these steps are omitted. The control process illustrated in FIG. 13 corresponds to the rectilinear steering angle calculating section.

In step S501, the controller 11 is configured to obtain a frequency distribution of the historical data of the steering angle stored in the memory, and to calculate a peak frequency value in the frequency distribution. Then, the controller 11 proceeds to step S502.

In step S502, the controller 11 is configured to set the peak frequency value calculated in step S501 as the rectilinear steering angle, and the controller 11 proceeds to step S201-1.

For example, in the case of an inexperienced driver who is not good at one of right and left turns, or when there is some unbalance characteristics in the driving route of the vehicle (e.g., the vehicle travels only in a specific route), the frequency difference between right turns and left turns is remarkable. Therefore, there is concern that an average value of the historical data of the steering angle used in the second embodiment may not actually represent a true rectilinear steering angle.

In contrast, the vehicle steering apparatus of the fifth embodiment is configured to obtain the frequency distribution of the historical data of the steering angle as shown in FIG. 14, and set a peak frequency value as the rectilinear steering angle. Therefore, the rectilinear steering angle is correctly set even when there is a difference in the frequencies between right turns and left turns by setting the rectilinear steering angle at the peak frequency value.

Accordingly, with the fifth embodiment, the rectilinear steering angle calculating section is configured to obtain the frequency distribution of the historical data of the steering angle and to set the peak frequency steering angle in the frequency distribution as the rectilinear steering angle. Therefore, the rectilinear steering angle can be accurately set without requiring information other than the steering angle, and without being influenced by the habits of the driver or the vehicle driving environment.

Sixth Embodiment

Figure 15:
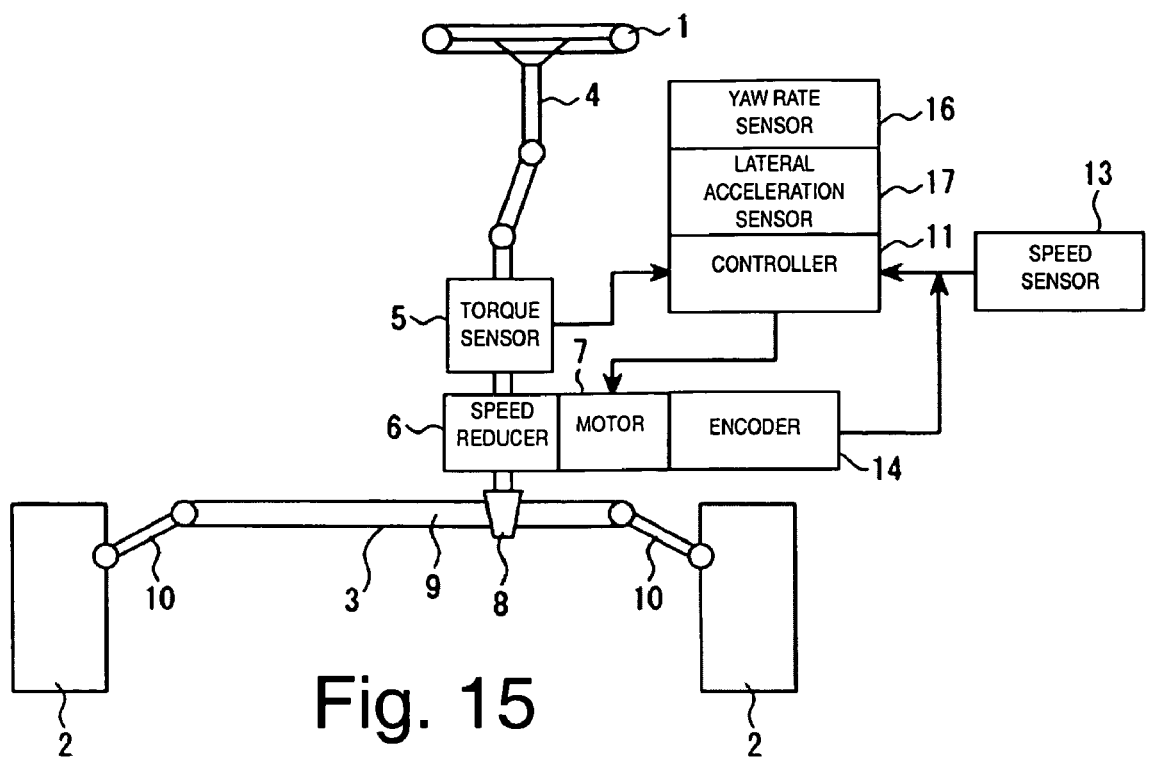
FIG. 15 is a schematic diagram of a vehicle steering apparatus in accordance with a sixth embodiment of the present invention.
Figure 16:
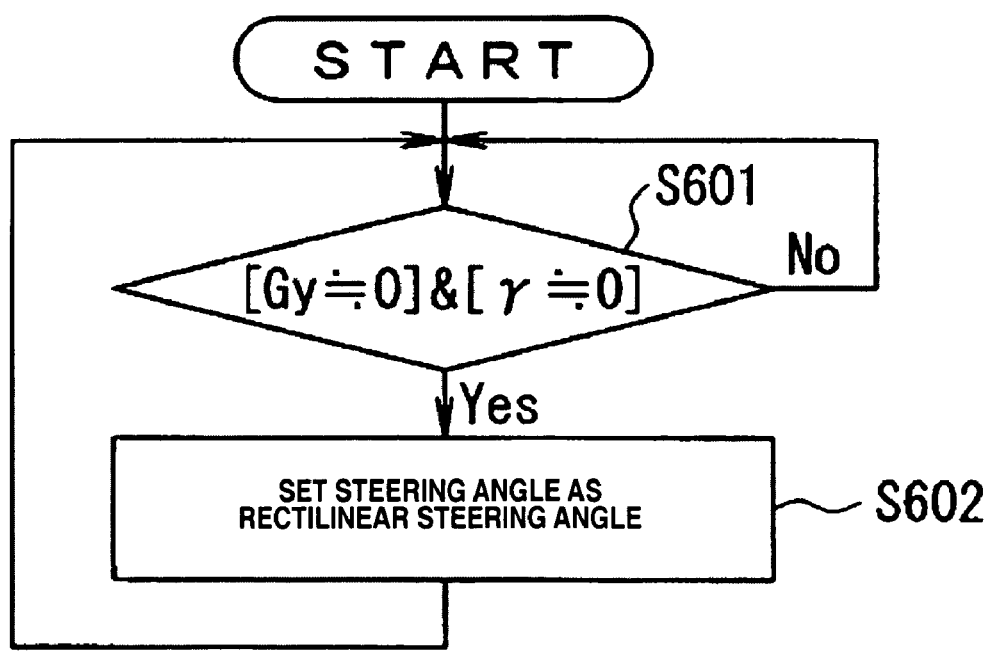
FIG. 16 is a flowchart showing a control flow of a rectilinear steering angle calculation control process executed by a controller of the vehicle steering apparatus in accordance with the sixth embodiment of the present invention.

Referring now to FIGS. 15 and 16, a vehicle steering apparatus in accordance with a sixth embodiment will now be explained. In view of the similarity between the second and sixth embodiments, the parts of the sixth embodiment that are identical to the parts of the second embodiment will be given the same reference numerals as the parts of the second embodiment. Moreover, the descriptions of the parts of the sixth embodiment that are identical to the parts of the second embodiment may be omitted for the sake of brevity.

FIG. 15 is a schematic diagram of the vehicle steering apparatus of the sixth embodiment. The description below focuses on explaining structural parts and operations of the second embodiment that are different from the second embodiment illustrated in FIG. 4. The vehicle steering apparatus of the sixth embodiment differs from the vehicle steering apparatus of the second embodiment in that a steering angle when a yaw rate and a lateral acceleration are both at predetermined values that equals to or close to zero is set to the rectilinear steering angle.

As seen in FIG. 15, the vehicle steering apparatus of the sixth embodiment includes a yaw rate sensor (yaw rate detecting section) 16 configured and arranged to detect the yaw rate of the vehicle, and a lateral acceleration sensor (lateral acceleration detecting section) 17 configured and arranged to detect the lateral acceleration of the vehicle.

The controller 11 is configured to control the motor 7 to generate a supplemental steering force based on the information from the torque sensor 5, the encoder 14, the yaw rate sensor 16, the lateral acceleration sensor 17, and the vehicle speed sensor 13.

FIG. 16 is a flowchart showing a control flow of the rectilinear steering angle calculation control process of the sixth embodiment. In the sixth embodiment, the rectilinear steering angle calculation control process illustrated in FIG. 16 replaces the rectilinear steering angle calculation control process illustrated in FIG. 6 of the second embodiment.

In step S601, the controller 11 is configured to detect the yaw rate y and the lateral acceleration Gy by the yaw rate sensor 16 and the lateral acceleration sensor 17. Then, the controller 11 is configured to determine whether or not the yaw rate y and the lateral acceleration Gy are both less than predetermined values that are set values close to zero. In other words, in step S601, the controller 11 is configured to determine whether the yaw rate y and the lateral acceleration Gy are both at values close to zero. When the determination in step S601 is YES, the controller 11 is configured to proceed to step S602. When the determination in step S601 is NO, the controller 11 is configured to repeat step S601.

In step S602, the controller 11 is configured to set the steering angle measured by the encoder 14 as the rectilinear steering angle, and the controller 11 proceeds to step S601.

Accordingly, the rectilinear steering angle can be set in a shorter time in the sixth embodiment since the rectilinear steering angle is determined based on the yaw rate y and the lateral acceleration Gy.

The vehicle steering apparatus of the sixth embodiment includes the yaw rate sensor 16 and the lateral acceleration sensor 17, and the controller 11 is configured to set the rectilinear steering angle based on the yaw rate y and lateral acceleration Gy. Thus, the time required to determine the pulling suppression force is shorter than the methods used in the first through third and fifth embodiments which employ the historical data of the steering angle or historical data of the steering torque to determine the rectilinear driving condition.

Seventh Embodiment

Figure 17:
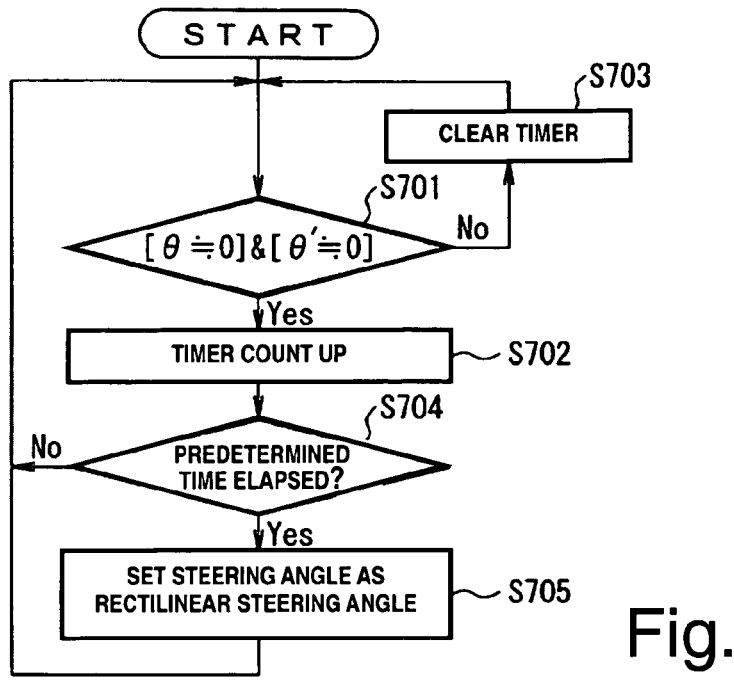
FIG. 17 is a flowchart showing a control flow of a rectilinear steering angle calculation control process executed by a controller of a vehicle steering apparatus in accordance with a seventh embodiment of the present invention.

Referring now to FIG. 17, a vehicle steering apparatus in accordance with a seventh embodiment will now be explained. In view of the similarity between the second and seventh embodiments, the parts of the seventh embodiment that are identical to the parts of the second embodiment will be given the same reference numerals as the parts of the second embodiment. Moreover, the descriptions of the parts of the seventh embodiment that are identical to the parts of the second embodiment may be omitted for the sake of brevity.

The vehicle steering apparatus of the seventh embodiment differs from the vehicle steering apparatus of the second embodiment in that the steering angle detected when the steering angle has been at a value zero or less than a predetermined value close to zero for a predetermined time is set as the rectilinear steering angle. The structure of the vehicle steering apparatus of the seventh embodiment is identical to that of the second embodiment shown in FIG. 4 except that the controller 11 is configured to perform a control process shown in a flowchart of FIG. 17 instead of the control process shown in the flow chart of FIG. 6 of the second embodiment.

FIG. 17 is a flowchart showing a control flow of the rectilinear steering angle calculation control process of the seventh embodiment. This control process shown in FIG. 17 corresponds to the rectilinear steering angle calculating section.

In step S701, the controller 11 is configured to detect a steering angle $\theta$ by the encoder 14, and to calculate a first order derivative value of the steering angle $\theta$ as a steering angle speed $\theta'$. Then, the controller 11 is configured to determine whether or not the steering angle $\theta$ and steering angle speed $\theta'$ are both less than the predetermined values close to zero. When the determination in step S701 is YES, the controller 11 is configured to proceed to step S702. When the determination in step S701 is NO, the controller 11 proceeds to step S703.

In step S702, the controller 11 is configured to count up the timer, and the controller 11 proceeds to step S704.

In step S703, the controller 11 is configured to clear the timer (count=0), and the controller 11 proceeds to step S701.

In step S704, the controller 11 is configured to determine whether or not the predetermined time has elapsed during which the time during which the steering angle $\theta$ and steering angle speed $\theta'$ are both less than predetermined values close to zero based on the timer count value. When the determination in step S704 is YES, the controller 11 proceeds to step S705. When the determination in step S704 is NO, the controller 11 proceeds to step S701.

In step S705, the controller 11 is configured to set the steering angle detected by the encoder 14 as the rectilinear steering angle, and the controller 11 proceeds to step S701.

Accordingly, in the seventh embodiment, the steering angle detected when the steering angle has been continuously less than the predetermined value close to zero for the predetermined time is set as the rectilinear steering angle. Thus, the rectilinear steering angle can be set in relatively short time.

In the vehicle steering apparatus of the seventh embodiment, information other than the steering angle is unnecessary since the rectilinear steering angle calculating section is configured to set the steering angle detected when the steering angle has been continuously less than the predetermined value close to zero for the predetermined time as the rectilinear steering angle. Therefore, the time required for the determination of the pulling suppression force can be reduced since cumulating of the historical data of the steering angle is unnecessary.

Although the seventh embodiment described an example in which the steering angle, when the steering angle and the steering angle speed have both been continuously detected to be less than a predetermined value at or near "0" for a predetermined time, is set as the rectilinear steering angle, the steering angle may be set as the rectilinear steering angle when the steering angle has been continuously detected to be a predetermined value at or near "0" for a predetermined time.

Eighth Embodiment

Figure 18:
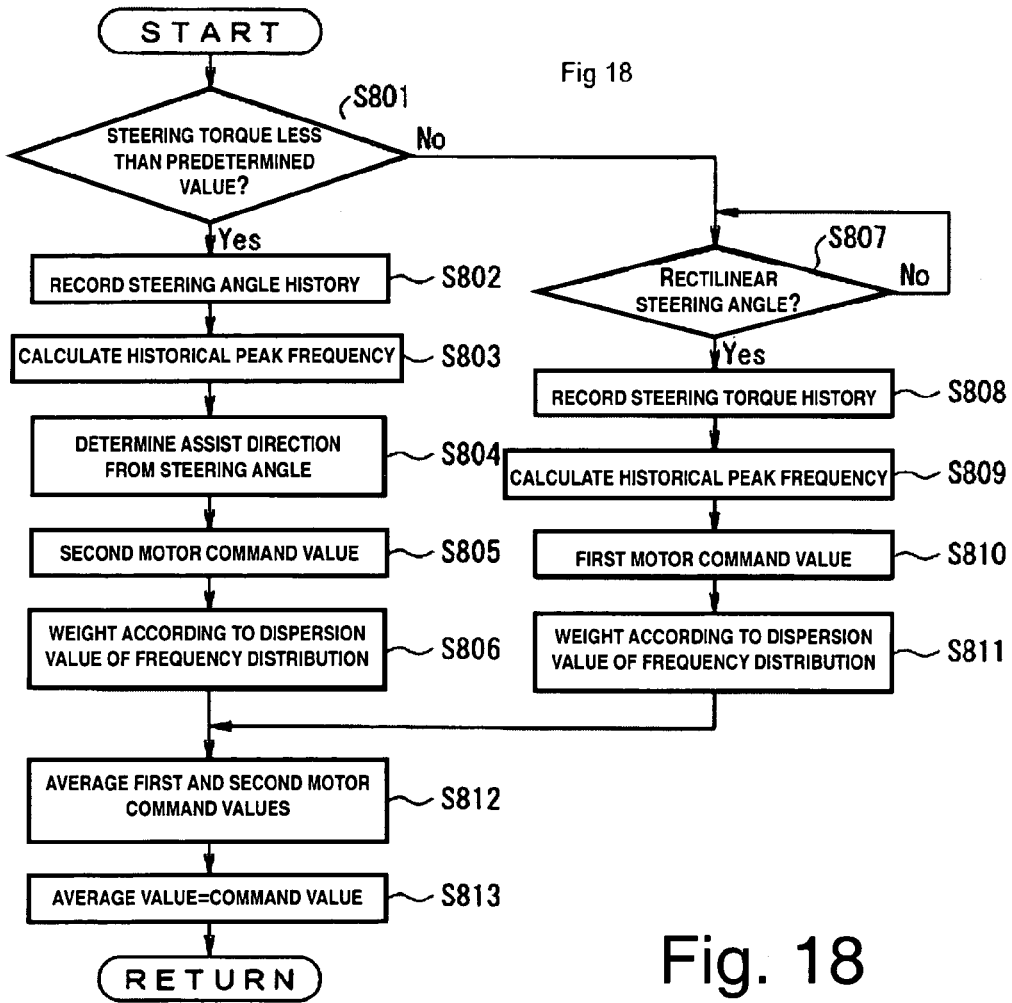
FIG. 18 is a flowchart showing a control flow of a rectilinear steering angle calculation control process executed by a controller of a vehicle steering apparatus in accordance with an eighth embodiment of the present invention.
Figure 19:
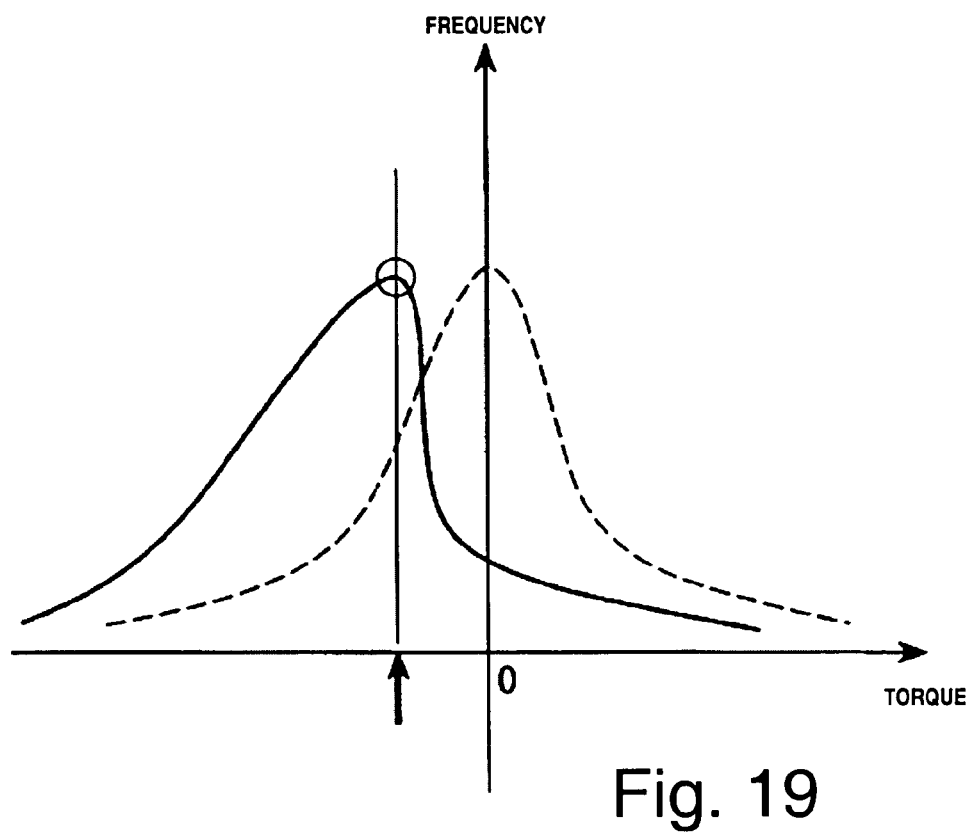
FIG. 19 is a diagram illustrating one example of a frequency distribution in historical data of the steering torque used in the vehicle steering apparatus in accordance with the eighth embodiment of the present invention.
Figure 20:
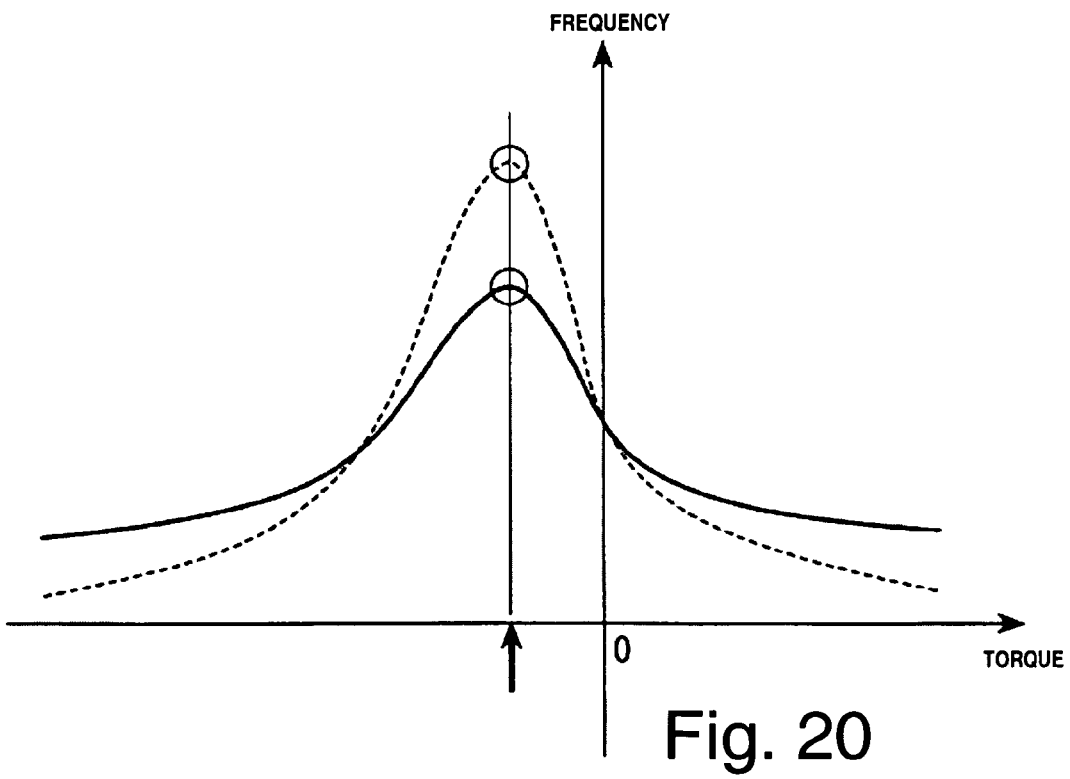
FIG. 20 is a diagram illustrating examples of different distribution dispersions in the historical data of the steering torque used in the vehicle steering apparatus in accordance with the eighth embodiment of the present invention.

Referring now to FIGS. 18-20, a vehicle steering apparatus in accordance with an eighth embodiment will now be explained. In view of the similarity between the second and eighth embodiments, the parts of the eighth embodiment that are identical to the parts of the second embodiment will be given the same reference numerals as the parts of the second embodiment. Moreover, the descriptions of the parts of the eighth embodiment that are identical to the parts of the second embodiment may be omitted for the sake of brevity.

The vehicle steering apparatus of the eighth embodiment differs from the vehicle steering apparatus of the second embodiment in that two control logics are used depending on the steering condition to calculate the pulling suppression force. More specifically, in the second embodiment, the two control logics are used to determine the pulling suppression force based on the historical data of the steering torque depending on the steering holding condition to obtain two control command values, the two control command values are weighted and then averaged to obtain a motor command value to suppress pulling of the vehicle. The structure of the vehicle steering apparatus of the eighth embodiment is identical to that of the second embodiment shown in FIG. 4 except that the controller 11 is configured to perform a control process shown in a flowchart of FIG. 18.

FIG. 18 is the flowchart showing the control flow of the pulling suppression control process of the eighth embodiment.

In step S801, the controller 11 is configured to determine whether or not the steering torque detected by the torque sensor 5 is less than a predetermined value. Step S801 corresponds to the steering holding condition detecting section. When the determination in step S801 is YES, the controller 11 proceeds to step S802. When the determination in step S801 is NO, the controller 11 proceeds to step S807.

In step S802, the controller 11 is configured to record the steering angle detected by the encoder 14 in the memory, and the controller 11 proceeds to step S803.

In step S803, the controller 11 is configured to calculate a frequency distribution of the historical data of the steering angle recorded in the memory, to calculate a peak frequency value, and the controller 11 proceeds to step S804.

In step S804, the controller 11 is configured to determine the degree of lateral veering of the vehicle from the peak frequency value of the historical data of the steering angle calculated in step S803, and to determine the assist direction to suppress veering of the vehicle, then the controller 11 proceeds to step S805.

In step S805, the controller 11 is configured to calculate a second motor command value in the assist direction determined in step S804, and the controller 11 proceeds to step S806.

In step S806, the controller 11 is configured to correct the second motor command value calculated in step S805 by weighting the second motor command value according to the dispersion of the historical data of the steering angle, and the controller 11 proceeds to step S807.

In step S807, the controller 11 is configured to calculate the rectilinear steering angle, and to determine whether or not the steering angle measured by the encoder 14 is the rectilinear steering angle. When the determination in step S807 is YES, the controller 11 proceeds to step S808. When the determination in step S807 is NO, the controller 11 is configured to repeat step S807. The rectilinear steering angle calculation method used in step S807 is the same method used in the second embodiment.

In step S808, the controller 11 is configured to record the steering torque measured by the torque sensor 5 in the memory, and the controller 11 proceeds to step S809.

In step S809, the controller 11 is configured to calculate the frequency distribution of the historical data of the steering torque, and to calculate the peak frequency value in the frequency distribution. Then, the controller 11 proceeds to step S810.

In step S810, the controller 11 is configured to calculate a first motor command value based on the peak frequency value calculated in step S809, then the controller 11 proceeds to step S11.

In step S811, the controller 11 is configured to correct the first motor command value calculated in step S810 by weighting according to the dispersion of the historical data of the steering torque, then the controller 11 proceeds to step S812.

In step S812, the controller 11 is configured to weight the corrected motor first and second command values calculated in steps S806 and S811 according to the number of historical data (i.e., historical data of the steering angle and historical data of the steering torque). The controller 11 is configured to calculate the average value of the weighted motor first and second command values. Then, the controller 11 proceeds to step S813. When, for example, the number of historical data of the steering angle is designated $N\theta$, and the number of historical data of the steering torque is designated $N_T$, weighting is performed according to the ratio of the numbers $N\theta$ and $N_T$. The weighted values are then used to calculate the average.

In step S813, the controller 11 is configured to set the average value calculated in step S812 as the pulling suppression motor command value, and the routine returns to the main control.

Accordingly, in the eighth embodiment, when the torque sensor 5 detects a steering torque value larger than a predetermined value close to zero, the peak value of the frequency distribution (FIG. 19) of the historical data of the steering torque is set as the first motor command value. The first motor command value is weighted according to the frequency distribution dispersion value of the historical data of the steering torque used to calculate the first command value. Specifically, when the dispersion is small, the first command value is used directly, and when the dispersion is large, a value smaller than the first command value is returned. FIG. 20 illustrates examples of different distribution dispersions in the historical data of the steering torque. Thus, the reliability of the peak frequency used is evaluated by the dispersion.

Conversely, when the torque sensor 5 detects a steering torque value smaller than the predetermined value close to zero, the peak value of the frequency distribution of the historical data of the steering angle is set as the second motor command value. The second motor command value is weighted according to the dispersion of the historical data of the steering angle similar to the first command value. After both calculated first and second command values have been weighted according to the number of historical data, the two values are averaged, and the average value is set as the pulling suppression force.

The vehicle steering apparatus of the eighth embodiment includes the steering holding condition detecting section (step S801) configured and arranged to detect the steering holding condition by the driver. When the driver is holding the steering wheel 1 with a torque that is greater than a predetermined value, the controller 11 is configured to control the pulling suppression force so as to reduce the steering torque at the rectilinear steering angle toward zero. On the other hand, when the driver is not holding the steering wheel 1 with a torque that is greater than the predetermined value or when the driver is not holding the steering wheel 1 at all, the controller 11 is configured to control the pulling suppression force so that the average value of the historical data of the steering angle detected when the steering torque is less than a predetermined value close to zero approaches the rectilinear steering angle. Thus, in the eighth embodiment, system errors are reduced by using a combination of the two control logics depending on the steering holding condition.

Furthermore, vehicle condition data acquisition rate is improved both when the driver is holding the steering wheel 1 steady and when the driver is not holding the steering wheel 1 steady, and as a result, the time required to determine the pulling suppression force can be reduced.

In the eighth embodiment, the controller 11 is configured to weight the pulling suppression forces (the first and second command values) calculated by two logics according to the number of historical data used by the respective logics, and to set the average value of the two weighted values as the pulling suppression force. Thus, operational errors interfering with the two logics can be avoided, and the overall system reliability is improved.

Since the controller 11 is configured to calculate the frequency distribution in the historical data of the steering torque and to set the peak frequency value as the pulling suppression force when calculating the pulling suppression force based on the historical data of the steering torque, the pulling suppression force can be set in a short time without being affected by driver habits or vehicle driving environment, and a simple system can be used.

Since the controller 11 is configured to calculate the frequency distribution in the historical data of the steering torque and to weight the pulling suppression force according to the dispersion value of the frequency distribution, the reliability of the pulling suppression force estimated from the historical data can be reflected in the amount of control of the motor 7. Furthermore, application of erroneous assist force can be reliably reduced.

Since the controller 11 is configured to calculate the distribution frequency in the historical data of the steering angle, and to weight the pulling suppression force according to the dispersion value of the frequency distribution, the reliability of the pulling suppression force estimated from the historical data can be reflected in the amount of control of the motor 7. Furthermore, application of erroneous assist force can be reliably reduced.

Ninth Embodiment

Referring now to FIG. 9, a vehicle steering apparatus in accordance with a ninth embodiment will now be explained. In view of the similarity between the first and ninth embodiments, the parts of the ninth embodiment that are identical to the parts of the first embodiment will be given the same reference numerals as the parts of the first embodiment. Moreover, the descriptions of the parts of the ninth embodiment that are identical to the parts of the first embodiment may be omitted for the sake of brevity.

Figure 21:
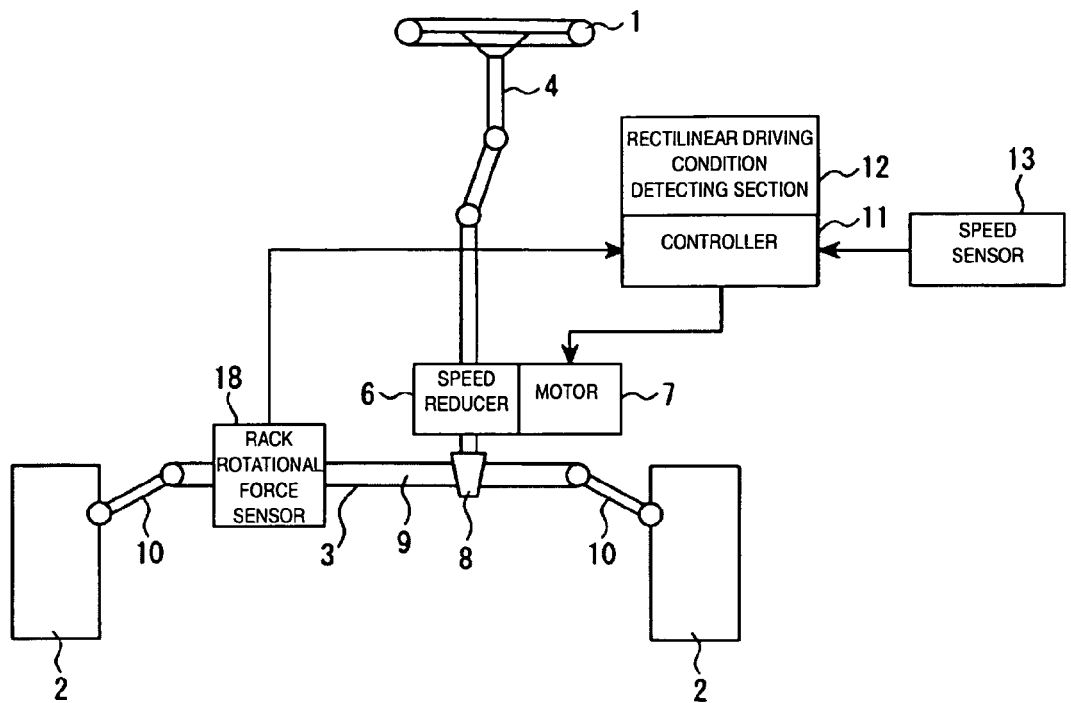
FIG. 21 is a schematic diagram of a vehicle steering apparatus in accordance with a ninth embodiment of the present invention.

FIG. 21 is a schematic diagram of the vehicle steering apparatus in accordance with the ninth embodiment. The description below focuses on explaining structural parts and operations of the second embodiment that are different from the first embodiment illustrated in FIG. 1. The vehicle steering apparatus of the ninth embodiment differs from the vehicle steering apparatus of the first embodiment in that the pulling force of the vehicle is calculated based on an axial force of the rack 9.

As seen in FIG. 21, the vehicle steering apparatus of the ninth embodiment includes a rack axial force sensor (reaction force sensor) 18 configured and arranged to detect the axial force of the rack 9. The rack axial force sensor 18 serves as a steering torque detecting section of this embodiment. The controller 11 is configured to control the motor 7 and to generate the pulling suppression force based on information from the rack axial force sensor 18, the rectilinear driving condition detecting section 12, and the vehicle speed sensor 13.

In the ninth embodiment, the pulling suppression force can be generated more accurately since the road reaction force is measured directly without the influence of the friction of the steering system by calculating the pulling force on the vehicle based on information from the rack axial force sensor 18.

Since the rack axial force sensor 18 configured and arranged to detect the road reaction force is used as the steering torque detecting section in the ninth embodiment, the pulling force on the vehicle can be measured with greater precision without the influence of mechanical friction of the steering system.

Tenth Embodiment

Figure 22:
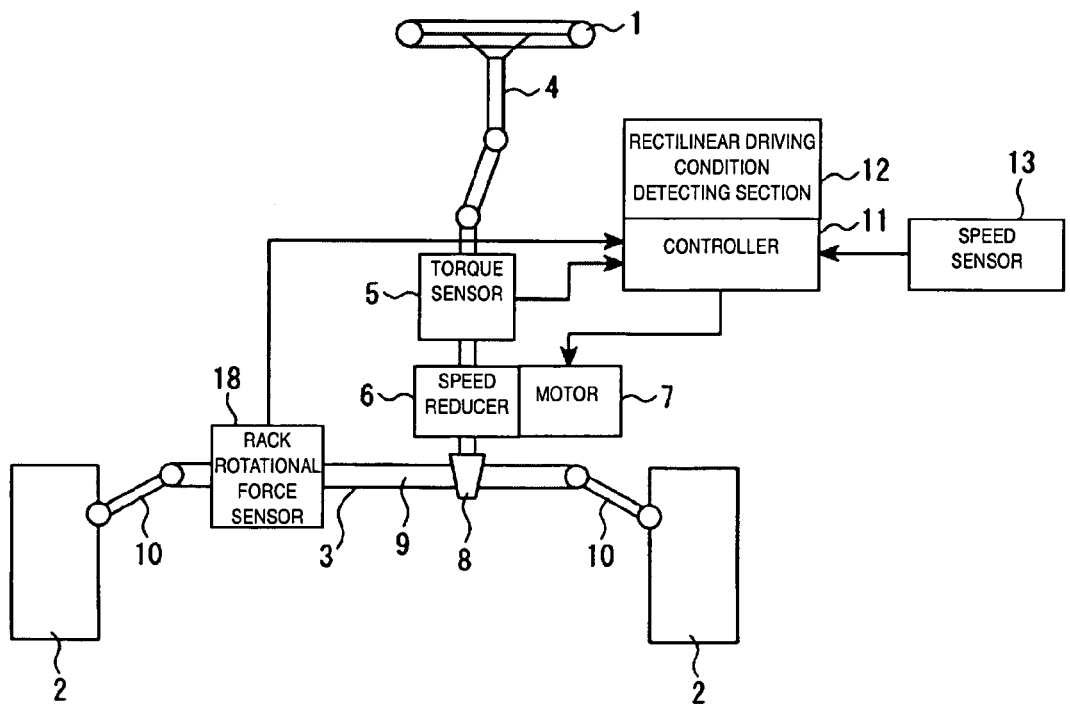
FIG. 22 is a schematic diagram of a vehicle steering apparatus in accordance with a tenth embodiment of the present invention.
Figure 23:
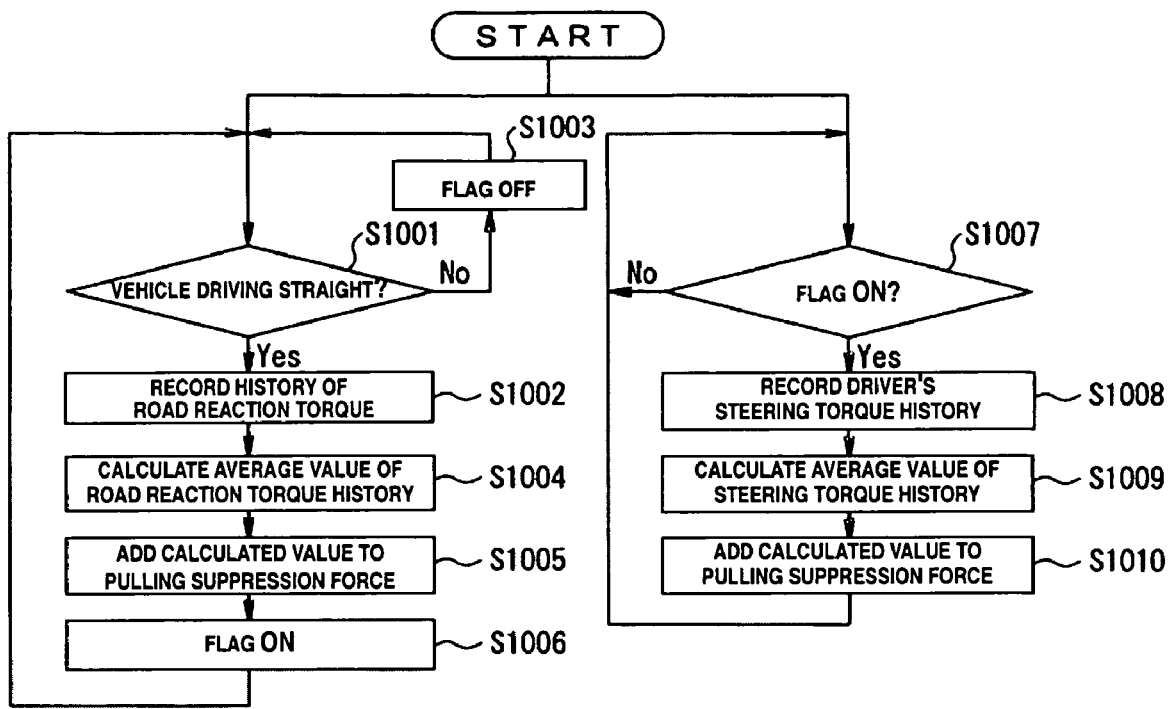
FIG. 23 is a flowchart showing a control flow of a pulling suppression control process executed by a controller of the vehicle steering apparatus in accordance with the tenth embodiment of the present invention.

Referring now to FIGS. 22 and 23, a vehicle steering apparatus in accordance with a tenth embodiment will now be explained. In view of the similarity between the ninth and tenth embodiments, the parts of the tenth embodiment that are identical to the parts of the ninth embodiment will be given the same reference numerals as the parts of the ninth embodiment. Moreover, the descriptions of the parts of the tenth embodiment that are identical to the parts of the ninth embodiment may be omitted for the sake of brevity.

FIG. 22 is a schematic diagram of the vehicle steering apparatus in accordance with the tenth embodiment of the present invention. The vehicle steering apparatus of the tenth embodiment differs from the vehicle steering apparatus of the ninth embodiment in that the torque sensor 5 is added to the structure of the ninth embodiment shown in FIG. 21. Moreover, in the tenth embodiment, two torque values (i.e., the road reaction force and the steering torque imparted by the driver) are detected separately, and separate pulling suppression controls are performed.

The controller 11 is configured to control the motor 7 and to generate the pulling suppression force based on information from the rack axial force sensor 18, the torque sensor 5, the rectilinear driving condition detecting section 12, and the vehicle speed sensor 13.

FIG. 23 is a flowchart showing a control flow of the pulling suppression control process executed by the controller 11 in the tenth embodiment.

In step S1001, the controller 11 is configured to determine whether or not the vehicle is in the rectilinear driving condition by the rectilinear driving condition detecting section 12 based on the vehicle behavior information. When the determination in step S1001 is YES, the controller 11 proceeds to step S1002. When the determination in step S1001 is NO, the controller 11 proceeds to step S1003.

In step S1002, the controller 11 is configured to record in the memory the axial force of the rack 9 detected by the rack axial force sensor 18 as the road reaction force, and the controller 11 proceeds to step S1004.

In step S1003, the controller 11 is configured to set a flag to OFF (=0), and the controller 11 proceeds to step S1001.

In step S1004, the controller 11 is configured to calculate an average value of the historical road reaction torque data stored in the memory, and the controller 11 proceeds to step S1005.

In step S1005, the controller 11 is configured to set the average value of the historical road reaction torque data calculated in step S1004 as the torque needed to suppress pulling of the vehicle (the road torque pulling suppression force). The controller 11 is configured to adjust the supplemental steering command value to the motor 7 based on the road torque pulling suppression force calculated in step S1004. Then, the controller 11 proceeds to step S1006.

In step S1006, the controller 11 is configured to set the flag to ON (=1), and the controller 11 proceeds to step S1001.

In step S1007, the controller 11 is configured to determine whether or not the flag is ON. When the determination in step S1007 is YES, the controller 11 proceeds to step S1008. When the determination in step S1007 is NO, the controller 11 is configured to repeat step S1007.

In step S1008, the controller 11 is configured to record the steering torque measured by the torque sensor 5 in the memory, and the controller 11 proceeds to step S1009.

In step S1009, the controller 11 is configured to calculate an average value of the historical data of the steering torque stored in the memory, and the controller 11 proceeds to step S1010.

In step S1010, the controller 11 is configured to set the average value of the historical data of the steering torque calculated in step S1009 as the torque needed to suppress pulling of the vehicle. The controller 11 is configured to adjust the supplemental steering command value to the motor 7 based on the pulling suppression force calculated in step S1009. Then, the controller 11 proceeds to step S1007.

Accordingly, in the tenth embodiment, the average value of the historical road reaction torque data detected by the rack axial force sensor 18 during the rectilinear driving condition is set as the torque needed to suppress pulling of the vehicle to offset the supplemental steering force. Thus, when the pulling suppression control is properly performed based on the road reaction force, the output of the torque sensor 5 during the rectilinear driving condition is expected to be zero. However, when the output of the torque sensor 5 during the rectilinear driving condition is not zero, the controller 11 is configured to perform further pulling suppression control that is identical to the control explained in the first embodiment. More specifically, the average value of the historical data of the steering torque during the rectilinear driving condition is added to the offset value (the pulling suppression force) calculated based on the road reaction force.

Therefore, the additional pulling suppression force control is performed in the tenth embodiment, and the correction amount of the supplemental steering force is revised while constantly ensuring the effectiveness of the pulling suppression control by separately detecting two torques values including the road reaction force and the steering torque imparted by the driver.

Accordingly, with the tenth embodiment of the present invention, since both the torque sensor 5 disposed on the steering shaft 4, and the rack axial force sensor 18 are used as the steering torque detecting section, it is possible to compare the pulling torque from the road surface and the steering torque of the driver by combining the sensor outputs, and it is possible to correct the pulling suppression force by this comparison result.

When the controller 11 confirms that the pulling suppression force based on the road reaction force is not effective (i.e., when the steering torque during the rectilinear driving condition is not substantially zero), the controller 11 is configured to correct the pulling suppression force based on the historical data of the steering torque detected during the rectilinear driving condition. Therefore, occurrence of the erroneous assisting force is reduced, the vehicle characteristics are converged faster to an ideal condition, and divergence in the pulling suppression force is prevented.

Eleventh Embodiment

Figure 24:
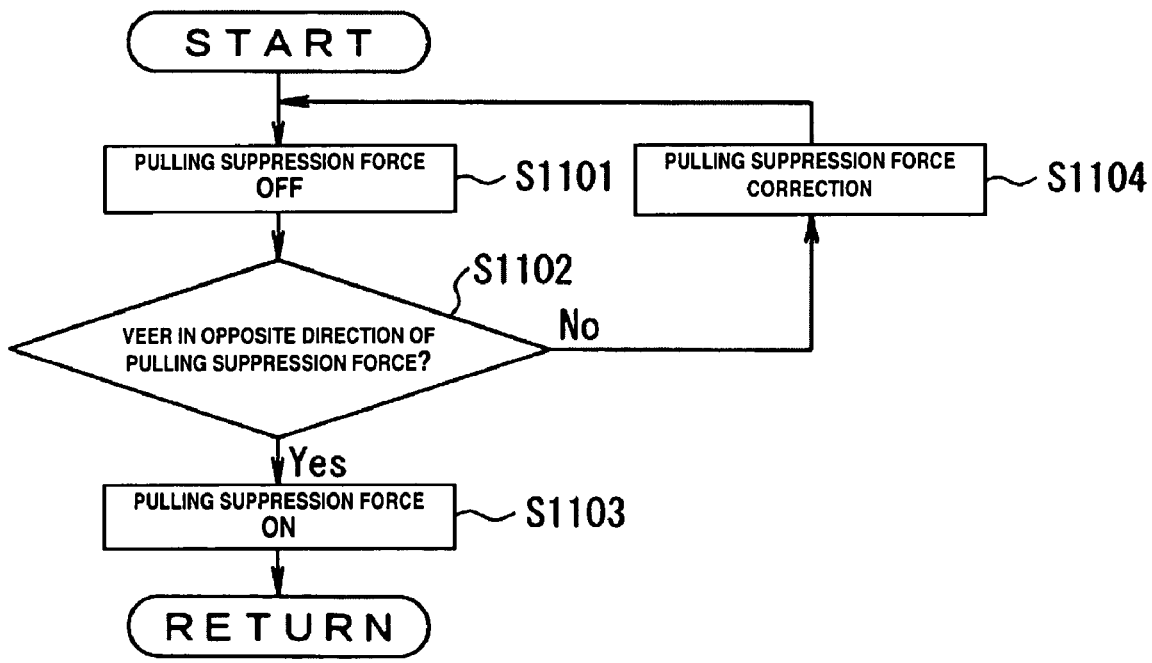
FIG. 24 is a flowchart showing a control flow of a steering angle correction control process executed by a controller of a vehicle steering apparatus in accordance with an eleventh embodiment of the present invention.
Figure 25:
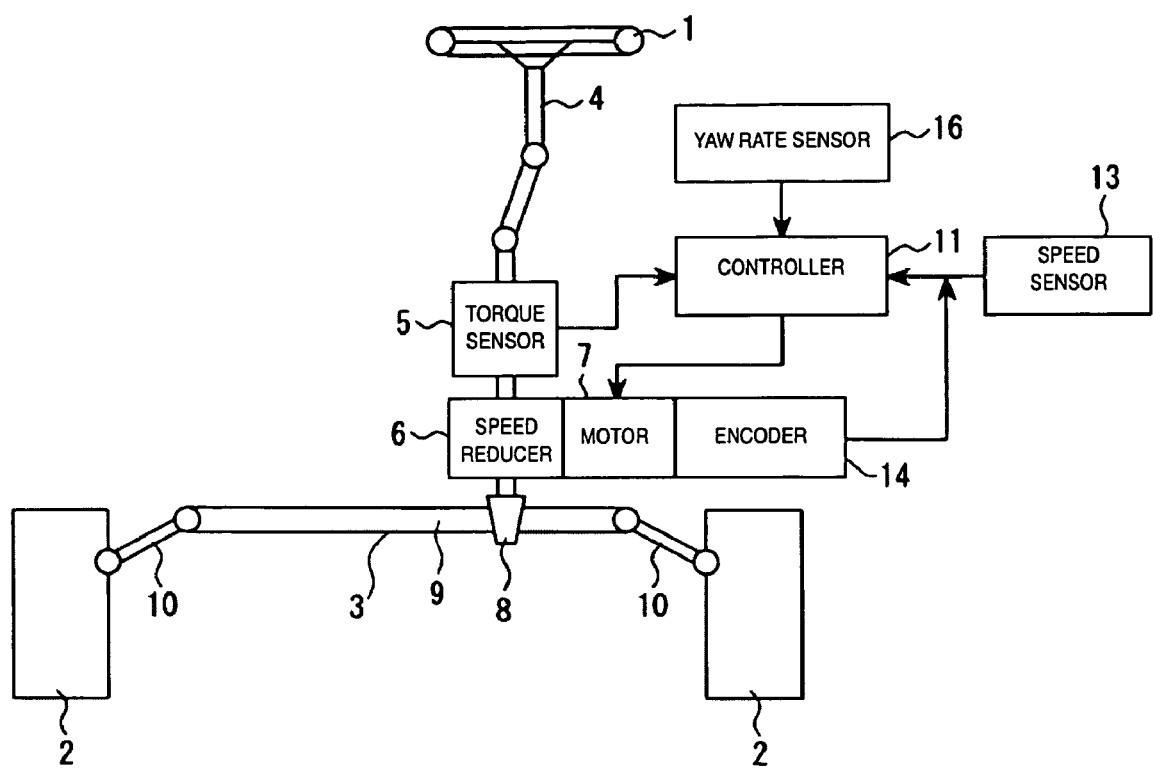
FIG. 25 is a schematic diagram of a vehicle steering apparatus in accordance with a twelfth embodiment of the present invention.

Referring now to FIGS. 24 and 25, a vehicle steering apparatus in accordance with a eleventh embodiment will now be explained. In view of the similarity between the second and eleventh embodiments, the parts of the eleventh embodiment that are identical to the parts of the second embodiment will be given the same reference numerals as the parts of the second embodiment. Moreover, the descriptions of the parts of the eleventh embodiment that are identical to the parts of the second embodiment may be omitted for the sake of brevity.

The vehicle steering apparatus of the eleventh embodiment differs from the vehicle steering apparatus of the second embodiment in that the control effectiveness is confirmed in the eleventh embodiment after the pulling suppression control of the second embodiment is performed. The structure of the vehicle steering apparatus of the eleventh embodiment is identical to that of the second embodiment shown in FIG. 4 except that the controller 11 is configured to perform the control process illustrated in a flowchart of FIG. 24 in addition to the control process of the second embodiment.

FIG. 24 is the flowchart showing the control flow of the pulling suppression force correction control process executed by the controller 11 of the eleventh embodiment. This control process is executed when it has been determined that the vehicle is driven at a low speed with the driver being holding the steering wheel 1 lightly or with the driver being not holding the steering wheel 1 based on the information from the torque sensor 5 and the vehicle speed sensor 13.

In step S101, the controller 11 is configured to set the pulling suppression force to zero, and the controller 11 proceeds to step S1102.

In step S102, the controller 11 is configured to detect the vehicle condition from the encoder 14 and the like to determine whether or not pulling of the vehicle occurs in a direction opposite to the assist direction of the motor 7 (i.e., the direction to which the pulling suppression force is applied). When the determination in the step S102 is YES, the controller 11 proceeds to step S1103. When the determination in step S1102 is NO, the controller 11 proceeds to step S1104.

In step S1103, the controller 11 is configured to generate the pulling suppression force, and the routine returns to the main control.

In step S1104, the controller 11 is configured to reset the historical data of the steering torque accumulated in the memory, and the controller 11 proceeds to step S1101.

Accordingly, in the eleventh embodiment, when it is determined that the vehicle is driven at a low speed with the driver being holding the steering wheel lightly or the driver being not holding the steering wheel, the pulling suppression force is temporarily set to zero, and the vehicle behavior is monitored by a vehicle driving condition detecting section such as the encoder 14. At this time, the pulling suppression force control is determined to be effective when veering of the vehicle occurs in the opposite direction to the pulling suppression force, and is determined to be ineffective when veering of the vehicle occurs in the same direction as the pulling suppression force. When the pulling suppression force control is determined to be ineffective, the historical data of the steering torque up to this point is reset, and the pulling suppression force control is performed again.

Accordingly, with the eleventh embodiment of the present invention, since the controller 11 determines the effectiveness of the pulling suppression force based on the change in vehicle behavior when the pulling suppression force has been temporarily increased or reduced, the suitability of the amount of correction in the supplemental steering force can be confirmed by monitoring the change in vehicle behavior when the amount of control has been intentionally increased or reduced.

Since the controller 11 confirms the effectiveness of the pulling suppression force when the vehicle is driven at a low speed with the driver being holding the steering wheel 1 lightly or the driver being not holding the steering wheel 1, the steering load on the driver (physical and mental loads) is reduced (since the steering torque imparted by the driver is small, the condition is determined not to be on the verge of emergency steering). Furthermore, the stability of the vehicle behavior is improved during low speed conditions, and the steering load on the driver is reduced.

Twelfth Embodiment

Referring now to FIGS. 25 to 31, a vehicle steering apparatus in accordance with a twelfth embodiment will now be explained. In view of the similarity between the second and twelfth embodiments, the parts of the twelfth embodiment that are identical to the parts of the second embodiment will be given the same reference numerals as the parts of the second embodiment. Moreover, the descriptions of the parts of the twelfth embodiment that are identical to the parts of the second embodiment may be omitted for the sake of brevity.

In the vehicle steering apparatus of the twelfth embodiment, the disturbance affecting the vehicle is estimated based on the historical data of the steering torque during the rectilinear driving condition and the pulling suppression force is imparted on the vehicle in accordance with the magnitude of the disturbance as in the first embodiment of the present invention. Moreover, in the twelfth embodiment, the pulling suppression force is varied according to the magnitude of the steering torque.

FIG. 25 is a schematic diagram of the vehicle steering apparatus of the twelfth embodiment. The description below focuses on explaining structural parts and operations of the second embodiment that are different from the second embodiment illustrated in FIG. 4.

The vehicle steering apparatus of the twelfth embodiment includes with a yaw rate sensor (yaw rate detecting section) 17 configured and arranged to detect the yaw rate of the vehicle. The controller 11 is configured to control the motor 7 and to generate the pulling suppression force based on information from the torque sensor 5, the encoder 14, the yaw rate sensor 16, and the vehicle speed sensor 13.

Figure 26:
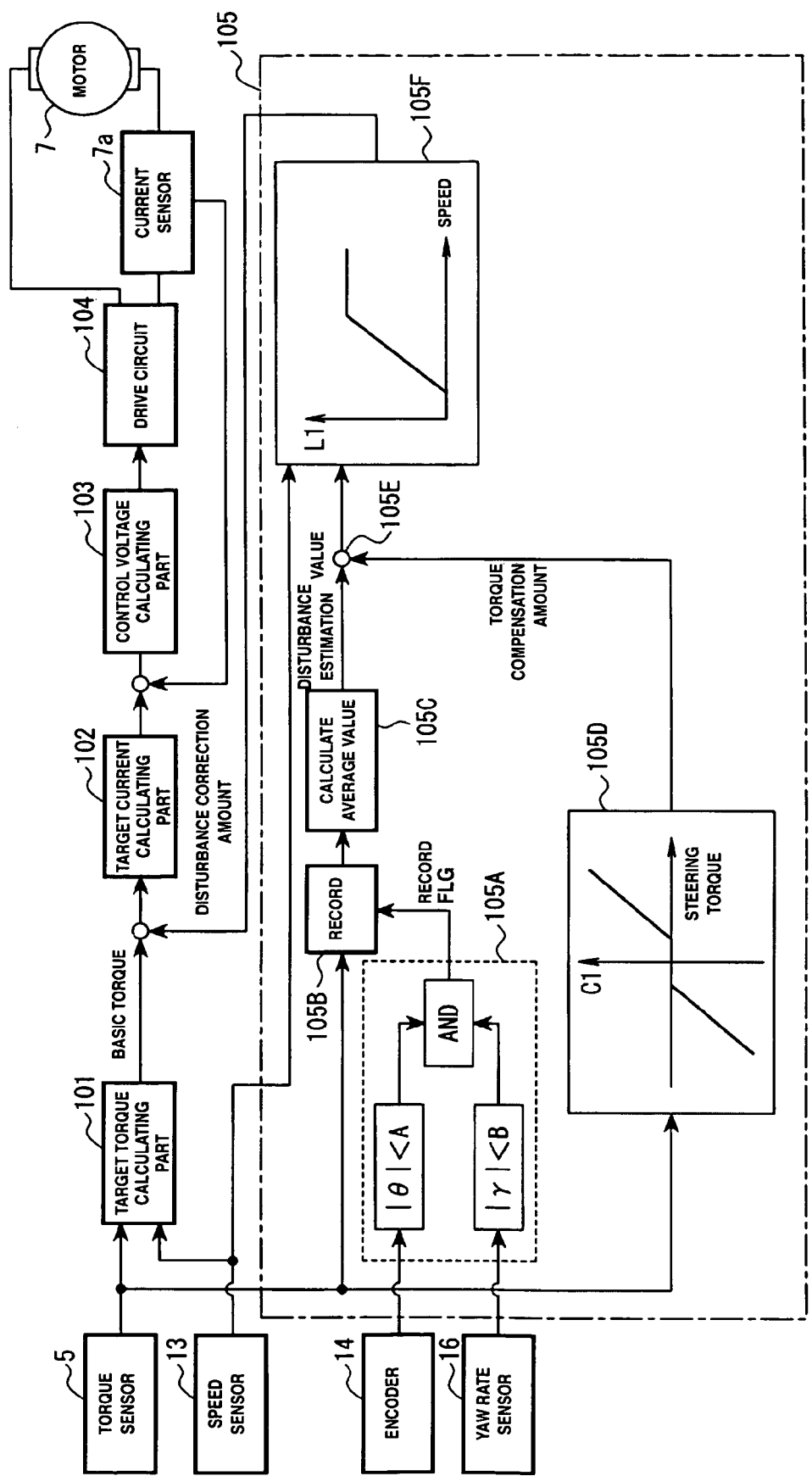
FIG. 26 is a block diagram illustrating a control flow of processes executed by a controller of the vehicle steering apparatus in accordance with the twelfth embodiment of the present invention.

FIG. 26 is a block diagram showing a control flow of the processes executed by the controller 11 of the twelfth embodiment.

The control block includes a target torque calculating part 101, a target current calculating part 102, a control voltage calculating part 103, a drive current controlling part 104, and a pulling suppression controlling part 105.

In the target torque calculating part 101, the controller 11 is configured to receive a signal indicative of the steering torque from the torque sensor 5 and a signal indicative of the vehicle speed from the vehicle speed sensor 13, and to calculate a standard torque command value equivalent to the amount of torque assist required by referring to an assist control map stored in the memory in advance.

Although not shown in the drawing, the target torque calculating part 101 includes a static assist part configured to reduce the driver steering load by generating an assisting torque approximately proportional to the steering torque, an inertia compensation assist part configured to perform motor inertia compensation, a dumping assist part configured to ensure steering system dumping, and a steering wheel return assist part configured to improve steering wheel return. The target torque calculating part 101 is configured to calculate a basic torque command value.

In the target current calculating part 102, the controller 11 is configured to convert a target torque, which is obtained by adding a disturbance correction amount calculated by the pulling suppression controlling part 105 described later to the basic torque command value calculated by the target torque calculating part 101, to a motor current command value, which is the drive current command value of the motor 7.

In the control voltage calculating part 103, the controller 11 is configured to calculate the motor voltage command value in the motor PWM control based on the motor current command value calculated by the target current calculating part 102.

In the drive current controlling part 104, the controller 11 is configured to control the motor drive current of the motor 7 by selectively switching ON/OFF switching elements such as FETs and the like in the drive circuit of the motor 7 based on the motor voltage command value calculated by the control voltage calculating part 103. In this case, the motor 7 drive current can be stably controlled by feedback control of the current signal detected by a motor current sensor 7a to the current servo.

In the pulling suppression controlling part 105, the controller 11 is configured to execute the pulling suppression control process in the following sequence.

First, in the rectilinear driving condition detecting part 105A, the controller 11 is configured to determine whether or not the vehicle is in the rectilinear driving condition. Specifically, the determination in the rectilinear driving condition detecting part 105A is made as to whether or not the absolute value $|\theta|$ of the steering angle measured by the encoder 14 is less than a predetermined value A, and the absolute value $|\gamma|$ of the yaw rate measured by the yaw rate sensor 16 is less than, a predetermined value B.

Since the steering angle is close to neutral and the yaw rate is close to zero when $|\theta|<A$ and $|\gamma|<B$, the vehicle is determined to be in the rectilinear condition and a record flag "1" is output. When $|\theta|\geq A$ or $|\gamma|\geq B$, a non-rectilinear driving condition is determined, and a record flag "0" is output.

Although the present embodiment has been described in terms of determining the rectilinear driving condition using the steering angle and the yaw rate, other vehicle behavior may be used, such as, lateral acceleration, vehicle slip, speed differential among the wheels and the like.

In a record part 105B, the controller 11 is configured to record the steering torque detected by the torque sensor 5 when the record flag=1, that is, when the vehicle is in the rectilinear driving condition.

In an average value calculating part 105C, the controller 11 is configured to calculate an average value of the historical data of the steering torque stored in the memory, and to output the result as a constant disturbance estimation value for causing the vehicle pulling phenomenon.

Although the constant disturbance estimation value is used as the average value of the historical data of the steering torque in the present embodiment, the median value of the historical data of the steering torque may be used. The constant disturbance estimation value may also be determined using a disturbance observer or the like.

Furthermore, in a torque compensation calculating part 105D, the controller 1 is configured to refer to a torque compensation calculation map stored in advance to calculate a torque compensation amount C1 based on the steering torque measured by the torque sensor 5.

The torque compensation calculation map is set so that the torque compensation amount C1 is set to zero in a region where the steering torque is close to zero (i.e., the region of the steering torque amount used in the rectilinear driving condition), the torque compensation amount C1 increases toward a positive direction as the steering torque increases toward a positive direction in a substantially proportional manner, and the torque compensation amount C1 increases toward a negative direction as the steering torque increases toward a negative direction in a substantially proportional manner.

In a torque compensating part 105E, the controller 11 is configured to subtract the torque compensation amount C1 calculated by the torque compensation calculating part 105D from the constant disturbance estimation value calculated by the average value calculating part 105C, and to output the result to a disturbance compensating part 105F.

In the disturbance compensating part 105F, the controller 11 is configured to integrate a gain L1 in the value input from the torque compensating part 105E, and to output the result as the disturbance correction amount (the pulling suppression force).

In this embodiment, the gain L1 is calculated with reference to a gain calculation map stored in advance based on the vehicle speed measured by the vehicle speed sensor 13. The gain calculation map is set such that the gain L1 is zero when the vehicle speed is substantially stationary, and the gain L1 increases proportional to the increase in vehicle speed up to a value of 1. Thus, the lower the vehicle speed is, the smaller the setting of the pulling suppression force becomes.

Accordingly, in the twelfth embodiment, the average value of the steering torque during rectilinear driving is set as the constant disturbance value causing the vehicle pulling phenomenon, and the pulling suppression force is provided with a constant disturbance offset amount in a direction canceling the pulling of the vehicle during the rectilinear driving condition. At this time, the amount of pulling suppression force decreases as the absolute value of the steering torque increases.

Figure 27:
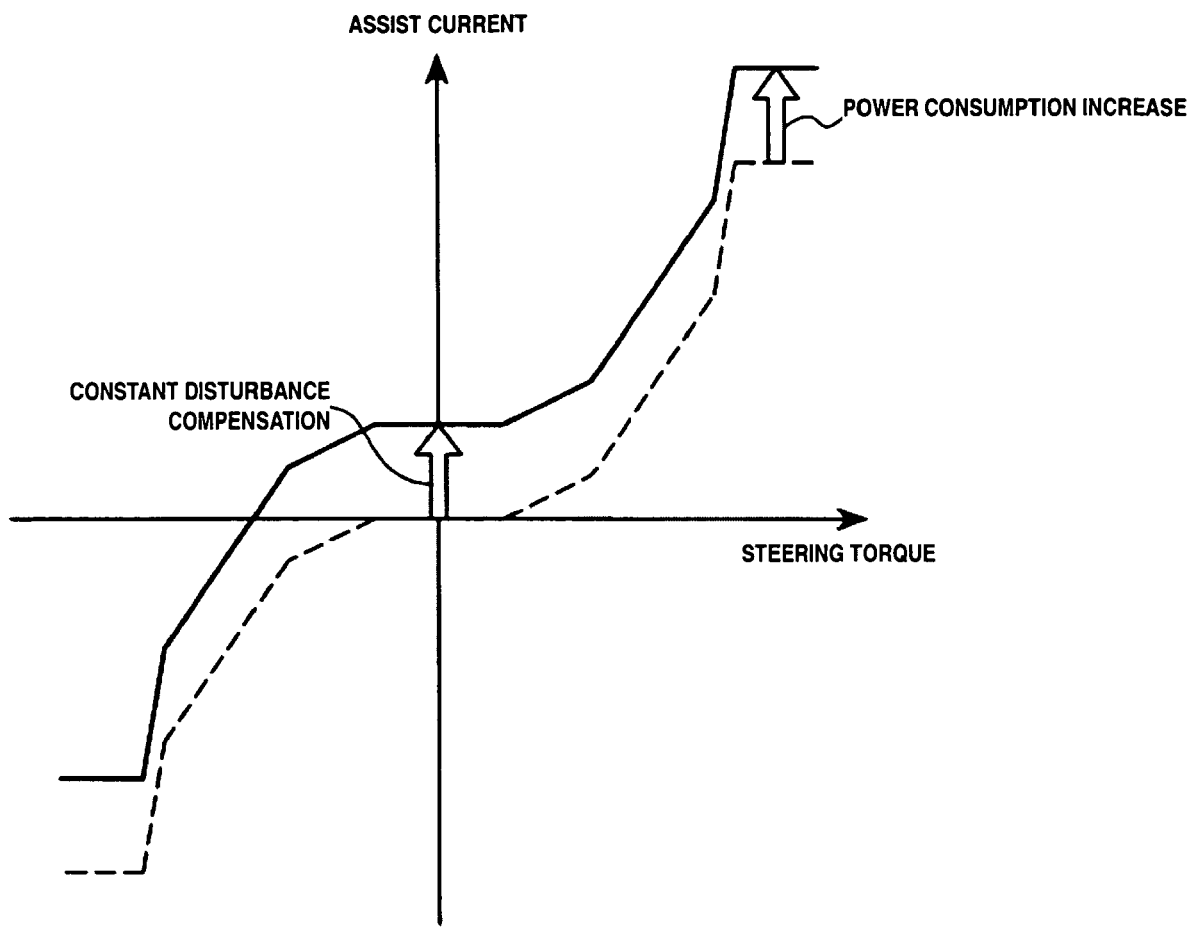
FIG. 27 is a diagram illustrating a relationship between steering torque and assist current when an offset amount is not changed according to the magnitude of the steering torque in a comparison example of the present invention.
Figure 28:
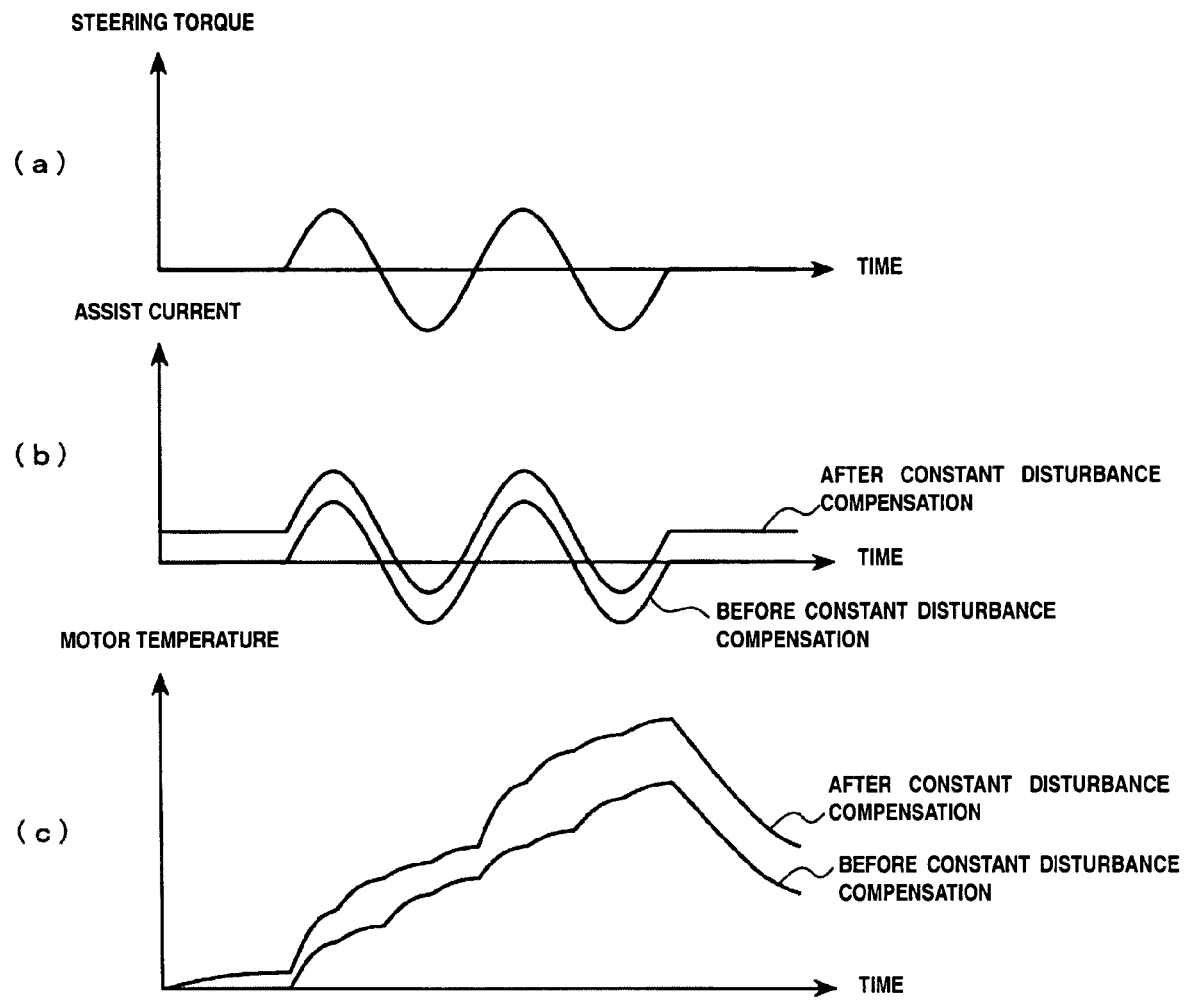
FIG. 28 is a timing chart illustrating when the offset amount is changed according to the magnitude of the steering torque in the vehicle steering apparatus in accordance with the twelfth embodiment of the present invention.

FIG. 27 is a diagram illustrating a relationship between the motor current (assist current) and the steering torque when the amount of offset (the pulling suppression force) does not change in accordance with the magnitude of the steering torque in a comparison example of the twelfth embodiment. In FIG. 27, the dashed line represents the characteristics before disturbance compensation, and the solid line represents characteristics after disturbance compensation. FIG. 28 is a timing chart when the amount of offset (the pulling suppression force) does not change in accordance with the magnitude of the steering torque with a diagram (a) showing the change over time in the steering torque, a diagram (b) showing the change over time in the assist current, and a diagram (c) showing the change over time in the motor temperature.

As shown in FIG. 27, when the supplemental steering force is provided with a constant disturbance offset amount regardless of the magnitude of the steering torque, for example, there is concern of increasing power consumption and adversely affecting fuel economy when the vehicle turns toward the same direction as the disturbance compensation direction (i.e., the direction of the pulling suppression force) when the steering is operated in the same direction as the direction of the pulling suppression force with a high torque. At this time, the motor temperature becomes elevated, as shown in the diagram (c) of FIG. 28. As a result, the upper limit temperature set in view of heat problems of the controller 11 and an EPS motor is rapidly reached, and the amount of assisting force is reduced.

Figure 29:
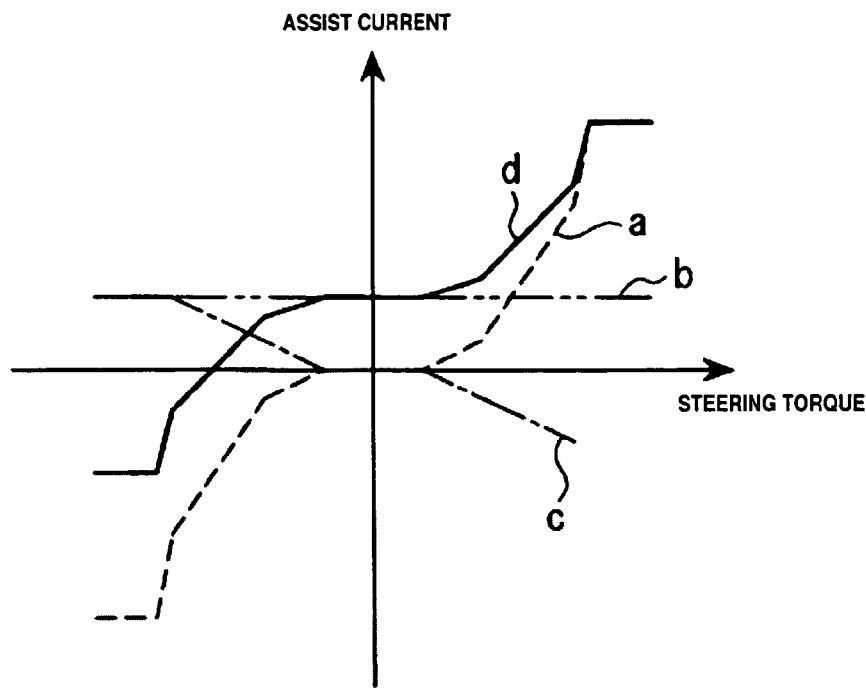
FIG. 29 is a diagram illustrating a basic torque, a constant disturbance estimation value, and a torque compensation amount calculated in accordance with the twelfth embodiment of the present invention.

FIG. 29 shows a relationship between the motor current (assist current) and the steering torque in accordance with the twelfth embodiment of the present invention. In FIG. 29, the dashed line a represents the basic torque calculated by the target torque calculating part 101, and the double chain line b represents the constant disturbance estimation value calculated by the average value calculating part 105C, and the single chain line c represents the torque compensation amount C1 calculated by the torque compensation calculating part 105D. The torque compensation amount C1 is shown as inverted in FIG. 29 because the torque compensation amount C1 is subtracted from the constant disturbance estimation value by the disturbance compensating part 105F. The solid line d represents the final assist current (the pulling suppression force) obtained by adding the above three values in FIG. 29.

Figure 30:
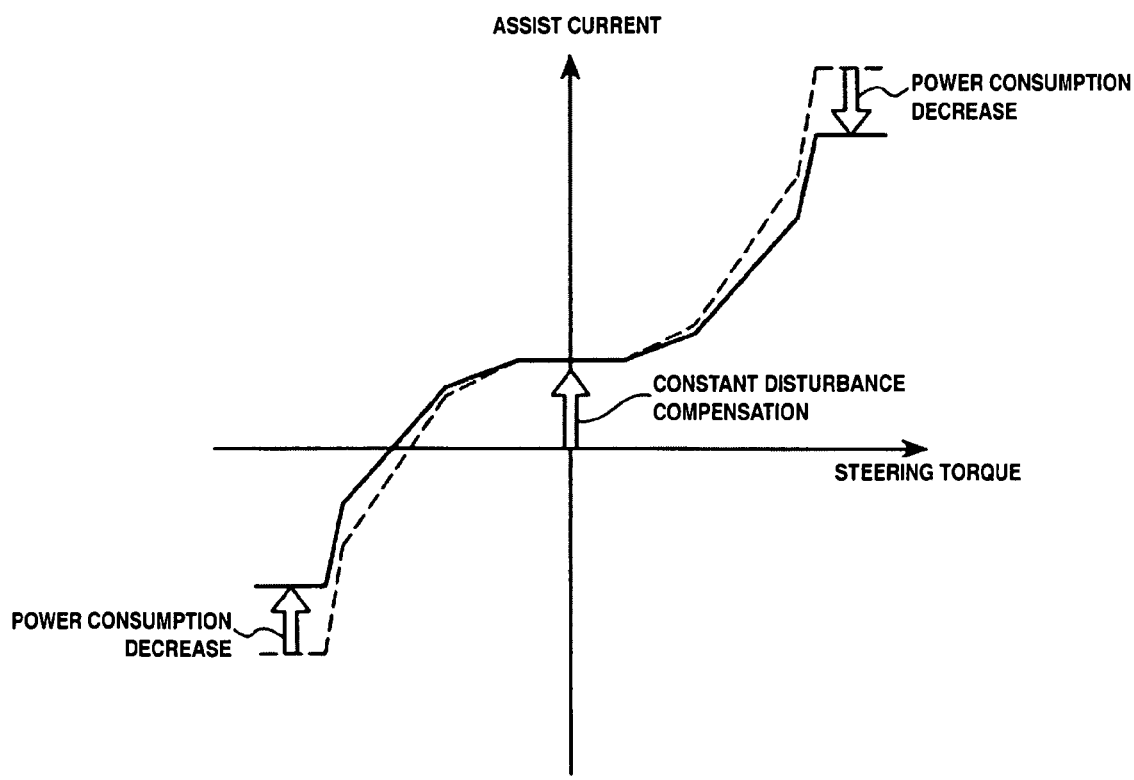
FIG. 30 is a diagram illustrating a relationship between steering torque and assist current when the pulling suppression control is performed by the vehicle steering apparatus in accordance with the twelfth embodiment of the present invention.

Thus, in the twelfth embodiment, since the supplemental steering force is offset by the pulling suppression force in a direction canceling the steering torque during the rectilinear driving condition, and the amount of offset (the pulling suppression force) is reduced as the absolute value of the steering torque increases, the assist characteristics showing the relationship between the steering torque and the assist current are indicated as the solid line in FIG. 30. Accordingly, pulling of the vehicle is suppressed during the rectilinear driving condition in a range close to a steering neutral point by imparting the pulling suppression torque that cancels the constant disturbance, and the increase in the pulling suppression force is suppressed as the steering torque increases, and thus, the current consumption in the high steering load range can be suppressed.

Figure 31:
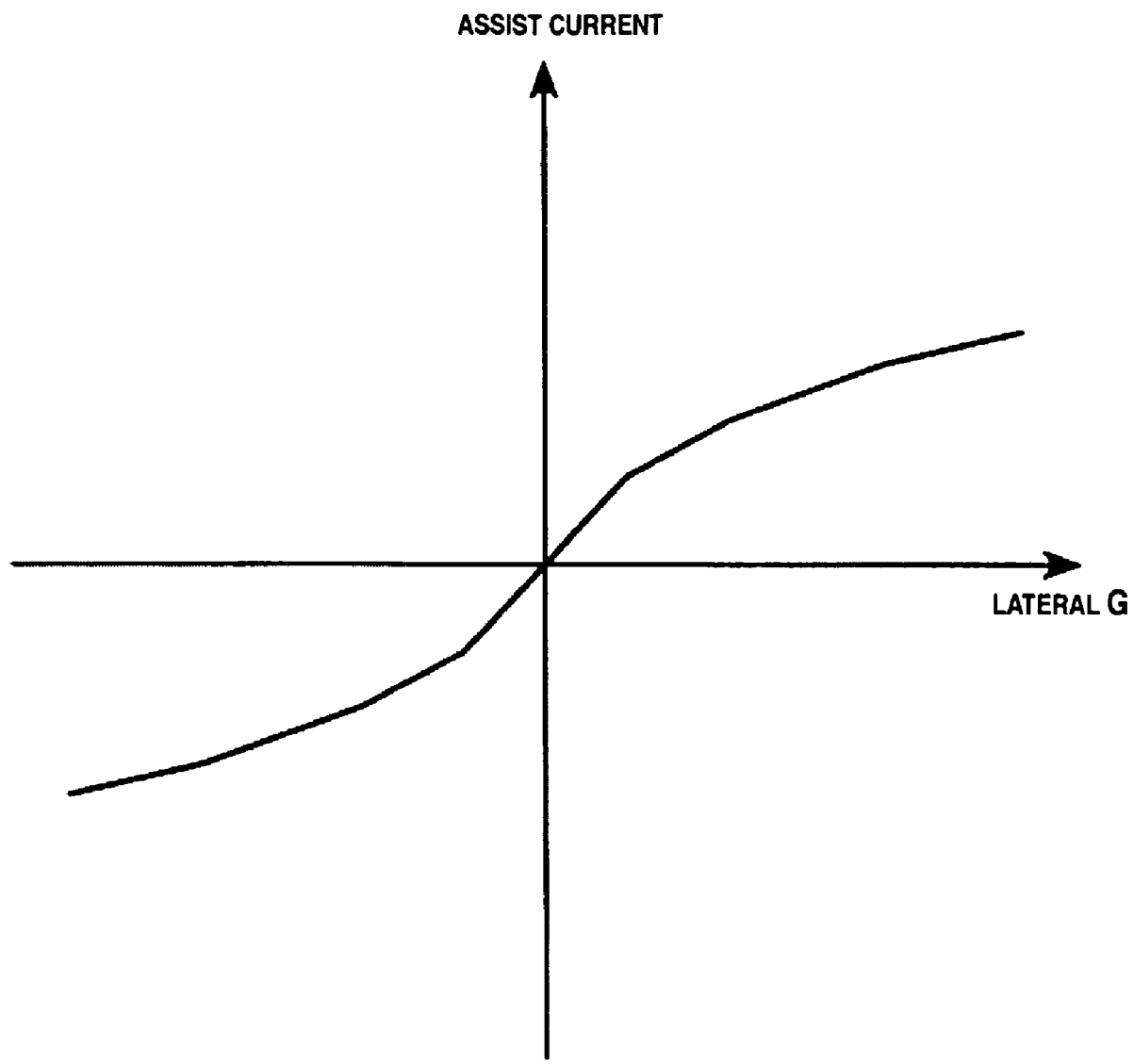
FIG. 31 is a diagram illustrating a relationship between lateral acceleration and steering torque in accordance with the present invention.

FIG. 31 illustrates the relationship between the lateral acceleration and the steering torque. In the present embodiment, the difference in steering force for left and right turning can be eliminated, as shown in FIG. 31, since the amount of offset (the pulling suppression force) is reduced as the absolute value of the steering torque increases.

With the twelfth embodiment of the present invention, the pulling suppression force decreases as the steering torque detected by the steering torque detecting section increases in a direction canceling the steering torque during the rectilinear driving condition. Therefore, when the constant disturbance is input due to pulling of the vehicle and the pulling suppression supplemental steering force is imparted in a direction to suppress the constant disturbance (pulling of the vehicle), driver's discomfort resulting from the suppression of pulling during the rectilinear driving condition is alleviated, and current consumption is suppressed while fuel consumption is improved when a high steering torque is applied in the same direction as the constant disturbance suppression direction. Furthermore, temperature elevation is suppressed since frequent operation of the heat protection circuit is suppressed.

Since the pulling suppression force decreases as the absolute value of the steering torque detected by the steering torque detecting section increases, the left and right differential of the steering force relative to the steering angle can be eliminated and natural steering force characteristics can be obtained.

Since the pulling suppression force decreases as the vehicle driving speed increases, controls can be executed to suppress pulling of the vehicle during times veering is easily generated. Furthermore, driver's discomfort accompanying erroneous operation can be prevented by setting the pulling suppression force to zero when it is difficult to estimate disturbances that are not generated by vehicle behavior.

Thirteenth Embodiment

Figure 32:
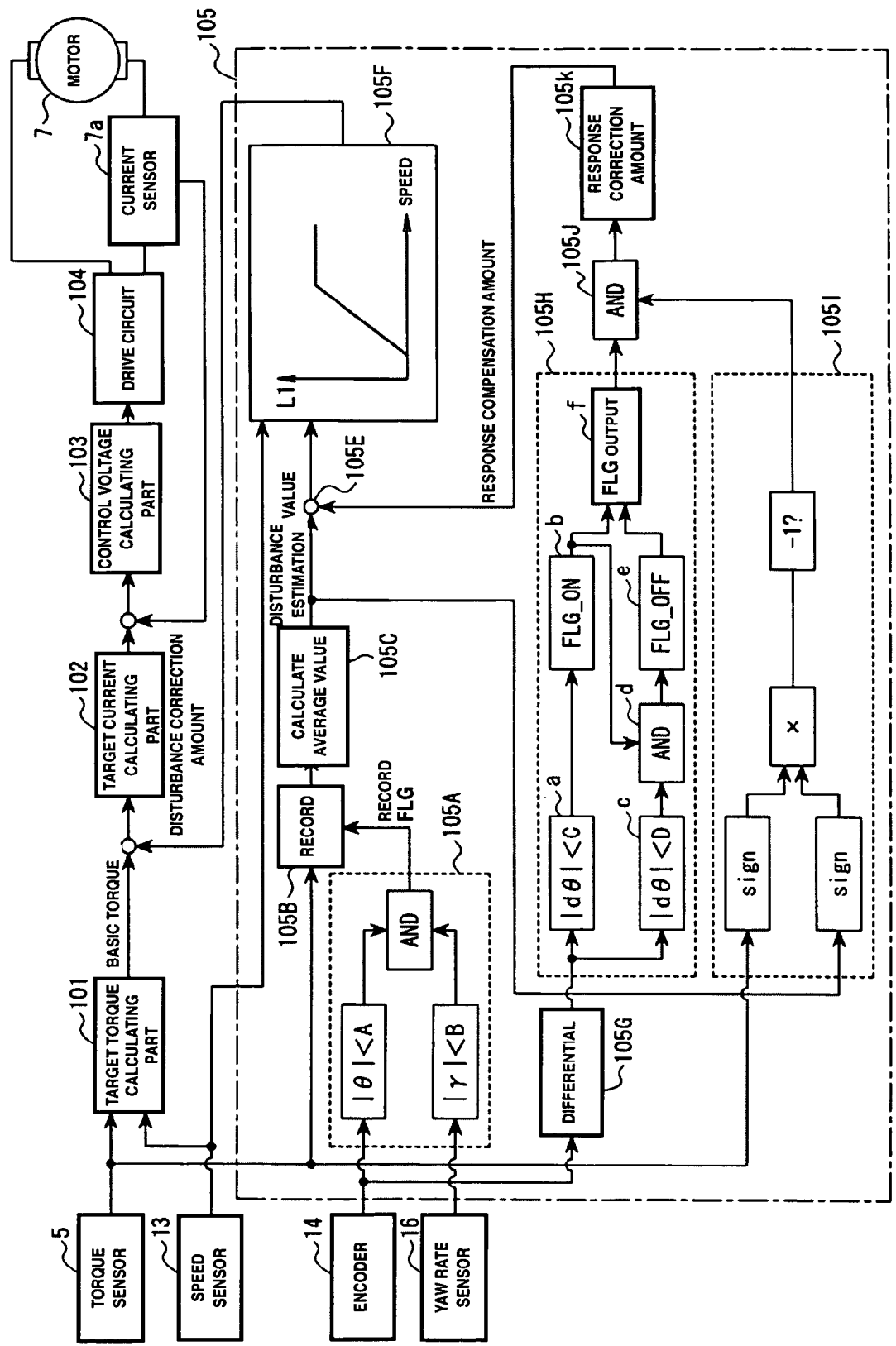
FIG. 32 is a block diagram showing a control flow of processes executed by a controller of a vehicle steering apparatus in accordance with a thirteenth embodiment of the present invention.
Figure 33:
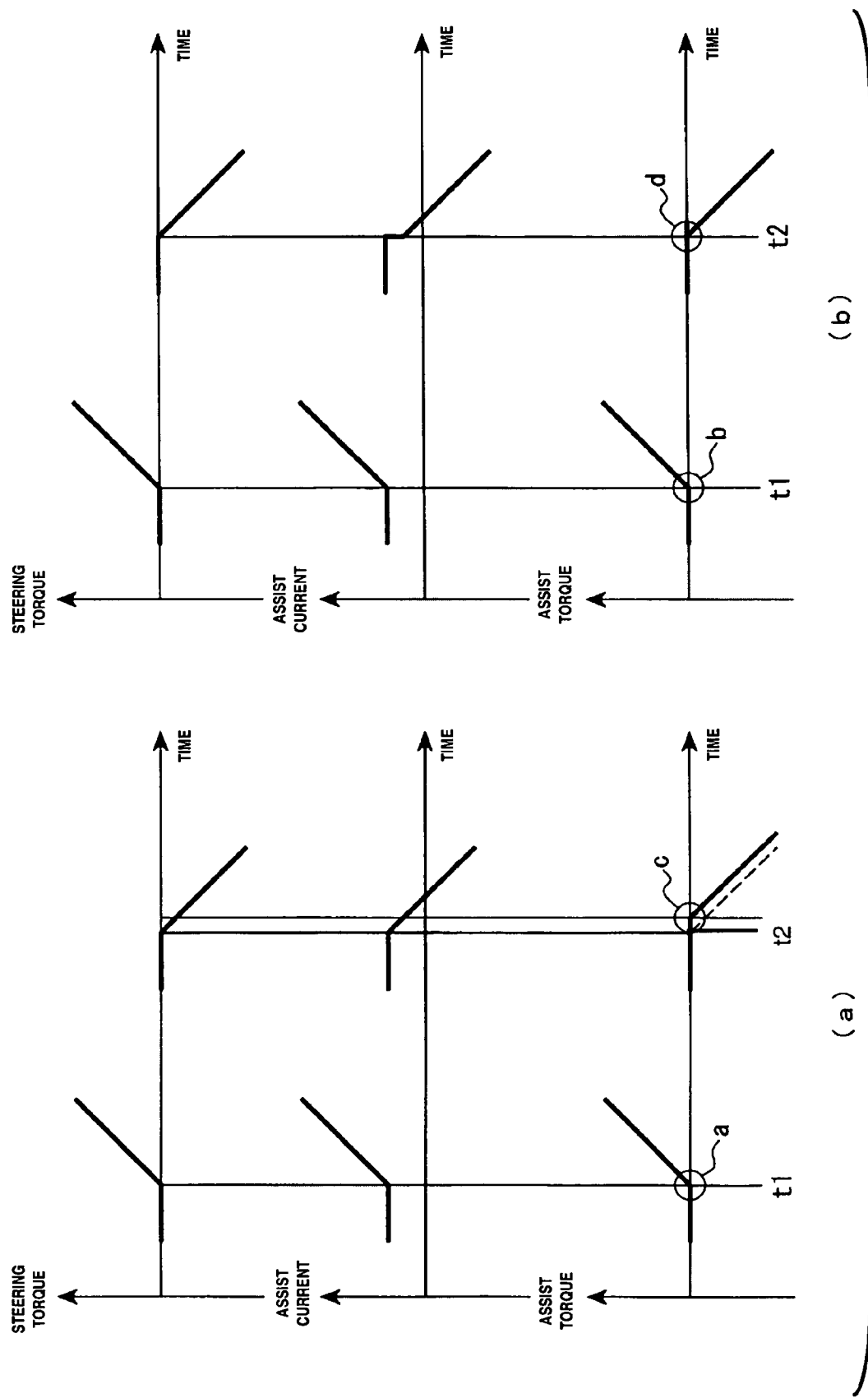
FIG. 33 is a pair of timing charts illustrating the pulling suppression control executed in the vehicle steering apparatus in accordance with the thirteenth embodiment of the present invention (timing chart (b)) as compared with a comparison example (timing chart (a))
Figure 34:
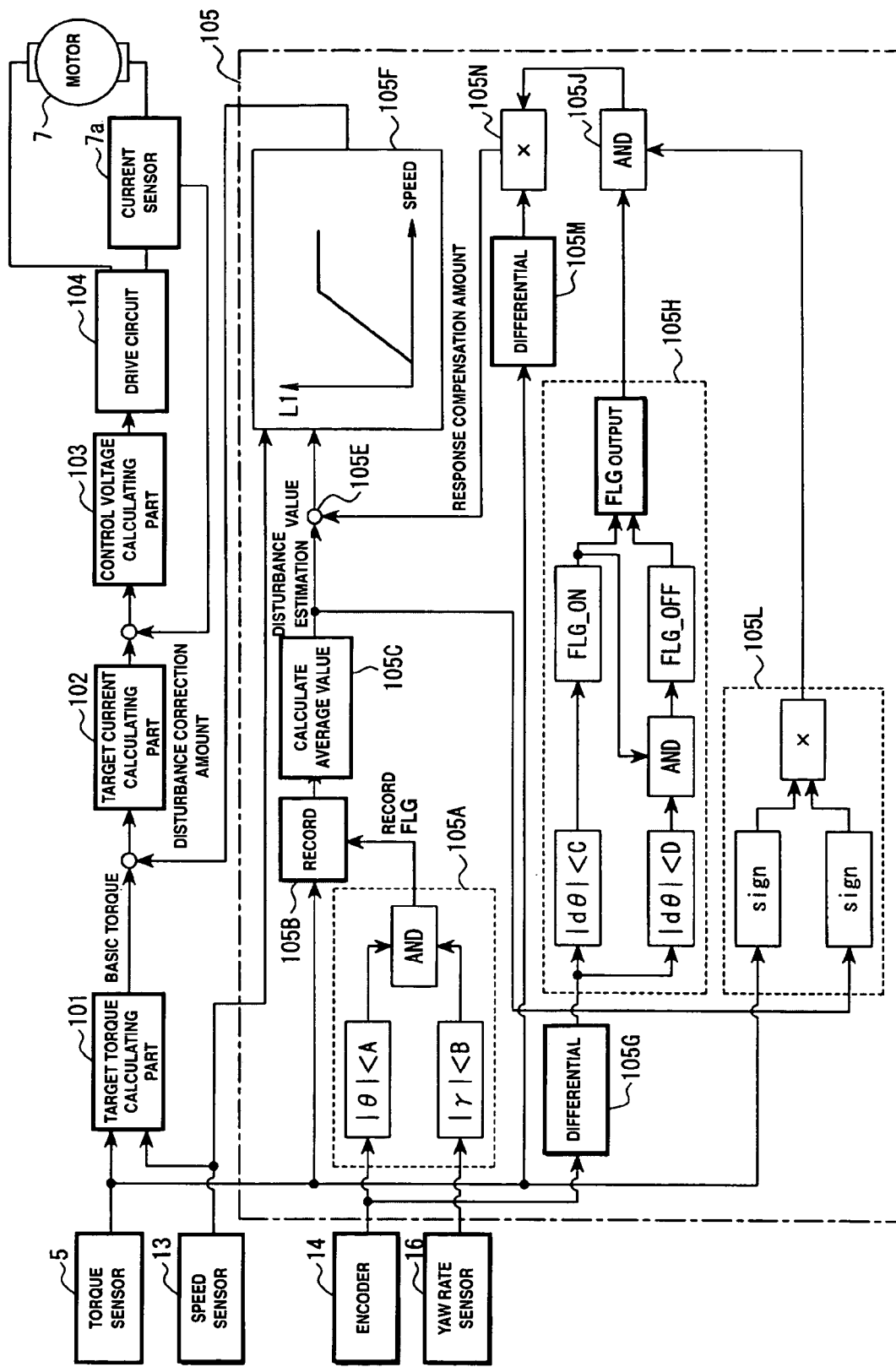
FIG. 34 is a block diagram illustrating a modified control flow executed by the controller of the vehicle steering apparatus in accordance with the thirteenth embodiment of the present invention.

Referring now to FIGS. 32 to 34, a vehicle steering apparatus in accordance with a thirteenth embodiment will now be explained. In view of the similarity between the twelfth and thirteenth embodiments, the parts of the thirteenth embodiment that are identical to the parts of the twelfth embodiment will be given the same reference numerals as the parts of the twelfth embodiment. Moreover, the descriptions of the parts of the thirteenth embodiment that are identical to the parts of the twelfth embodiment may be omitted for the sake of brevity.

The vehicle steering apparatus of the thirteenth embodiment differs from the vehicle steering apparatus of the twelfth embodiment the pulling suppression force is varied according to whether or not the steering direction matches the direction of the applied pulling suppression force when the condition changes from a steering holding state to a steering operating state. The structure of the thirteenth embodiment is identical to that of the twelfth embodiment shown in FIG. 25 except that the controller 11 is configured to execute a control flow illustrated in a block diagram of FIG. 32 instead of the control flow shown in FIG. 26 of the twelfth embodiment.

FIG. 32 is the block diagram showing the control flow of the processes executed by the controller 11 of the thirteenth embodiment. The control processes that are identical to the control process of the twelfth embodiment shown in FIG. 26 are identified by identical reference numbers, and the following description focuses on those parts of the process that differ from the twelfth embodiment.

In a steering angle speed calculating part 105G of the pulling suppression controlling part 105, the steering angle θ detected by the encoder 14 is differentiated, and a steering angle speed dθ is calculated.

In a steering wheel operating condition determining part 105H, the controller 11 is configured to determine whether or not the operating state of the steering wheel 1 has changed via the driver from a steering holding state to a steering operating state based on the steering angle speed dθ calculated by the steering angle speed calculating part 105G. In the steering wheel operating condition determining part 105H, the controller 11 is first configured to determine whether or not the steering wheel operating condition is in the steering holding state with a steering angle speed absolute value |dθ| is less than a predetermined value C in a processing part a, then determines whether or not the steering wheel operating condition has changed from the steering operating state to the steering holding state in the processing part b based on the processing result in the processing part 1. Then, the determination flag is set to "1" when the steering wheel operating condition has changed from the steering operating state to the steering holding state.

Moreover, in the processing part c, the controller 11 is configured to determine whether or not the steering wheel operating condition is in the steering holding state with the steering angle speed absolute value |dθ| is less than a predetermined value D. When the processing part b inputs the determination flag "1" and it is determined in the processing part c the steering wheel operating condition is in the steering holding state, the determination flag value of "1" is output by the processing part d. Otherwise, the determination flag value of "0". In the processing part e, the controller 11 is configured to determine whether the determination flag value output from the processing part d is changed from "0" to "1". When it is determined that the determination flag value is changed from "0" to "1" the determination flag is reset to "0" in the processing part e. Otherwise, the determination flag value of "1" is maintained.

In the processing part f, the controller 11 is configured to output a final determination flag based on the processing result of the processing parts b and e. In other words, the determination flag value output from the processing part f is "1" when the condition of the operating state of the steering wheel by the driver is in a transition between the steering holding state and the steering holding state. Otherwise, the determination flag value of "0" is output in the processing part f.

In a steering direction determining part 105I, the controller 11 is configured to determine whether or not the driver steering direction matches the disturbance input direction (the direction to which the pulling suppression force is imparted), and to output "1" when the directions match, and to output "0" at other times. Specifically, the steering torque polarity measured by the torque sensor 5 (1 when positive, −1 when negative) and the polarity of the disturbance estimation value (1 when positive, −1 when negative) are multiplied and when the result is "1" (i.e., when the steering torque polarity and the disturbance estimation value polarity match) the value 1 is output, whereas "0" is output at other times.

In a response characteristic compensation determining part 105J, the controller 11 is configured to output the product of the output results of the steering wheel operating condition determining part 105H and the steering direction determining part 105I. In other words, the value "1" is output from the response characteristic compensation determining part 105J when the driver operates the steering wheel in a direction opposite from the disturbance compensation direction (the direction to which the pulling suppression force is imparted) in a transition between the steering holding state and the steering holding state. Otherwise, the value "0" is output from the response characteristic compensation determining part 105J.

In a response characteristic compensation calculating part 105K, the controller 11 is configured to output a predetermined fixed value as the response characteristic compensation amount when the output result of the response characteristic compensation determining part 105J is "1."

Accordingly, in the thirteenth embodiment, the average value of the steering torque during the rectilinear driving condition is set as the constant disturbance value causing the vehicle pulling phenomenon, and the supplemental steering force is adjusted by the constant disturbance offset (the pulling suppression force) in a direction canceling the steering torque (the pulling force) imparted on the vehicle during rectilinear driving. At this time, the disturbance compensation amount (the pulling suppression force) is reduced by a predetermined amount (response characteristic compensation amount) when the driver operates the steering wheel 1 in a transition between the steering holding state and the steering holding state in a direction opposite from the direction canceling the steering torque imparted on the vehicle during the rectilinear driving condition.

FIG. 33 is a timing chart showing a change in the assist torque accompanying the change in steering operating condition. A diagram (a) is a timing chart when there is no response characteristic compensation in a comparison example of the present invention, and a diagram (b) is a timing chart showing the response characteristic compensation of the present embodiment.

When the driver is holding the steering wheel in a neutral position while the pulling suppression force is imparted in order to compensate the pulling force on the vehicle due to the constant disturbance during the rectilinear condition, and the driver operates the steering wheel 1 at the time t1 in a direction to which the pulling suppression force is imparted. In such case, as seen in sections a and b of the diagrams (a) and (b) of FIG. 33, an assist torque is generated at the same time as the flow of the assist current is generated, and steering response with natural steering characteristics can be obtained.

When the pulling suppression force is imparted, the motor 7 constantly generates the torque in a direction that cancels the pulling force on the vehicle. At this time, the speed reducer 6 is pressed so as to generate a force in a predetermined direction. Since there is generally a specific play, a so-called backlash, in the speed reducer 6, there exists a transitional period during which the force is not transmitted when changing from a condition in which a predetermined force is applied in a certain direction and a force is applied in the opposite direction.

Therefore, when no response characteristic compensation is preformed when steering at time t2 in a direction different from the direction in which the disturbance correction is applied, the assist torque is generated after the backlash of the speed reducing device even though an assist current is flowing, as shown in part c of the diagram (a) of FIG. 33 in the comparison example. As a result, there is a difference in steering response when steering left and steering right.

In contrast, in the thirteenth embodiment, the disturbance correction amount is corrected by a predetermined response characteristic compensation correction amount when changing from the steering holding state to the steering operating state in a direction opposite from the direction of application of the disturbance correction amount (the pulling suppression force).

Therefore, when steering in a direction different from the direction of application of the disturbance correction amount at time t2, the assist current for pulling suppression control is reduced at predetermined amount, and steering response is improved, as shown in part d of the diagram (b) of FIG. 33. As a result, steering response characteristics are substantially the same when turning left and turning right.

In the present embodiment, the steering wheel operating condition determining part 105H corresponds to the steering wheel operating condition detecting section.

Since the pulling suppression force is less when the steering force is in a direction canceling the steering torque during the rectilinear driving condition than when the steering force changes from the steering wheel operating condition to the opposite direction of the direction canceling the steering torque during the rectilinear driving condition, there is an improvement of the steering response delay when the speed reducer 6 experiences a backlash, and natural steering response characteristics that are substantially the same for turning right and turning left can be obtained.

Referring now to FIG. 34, a modified operation of the thirteenth embodiment will now be explained. In the modified embodiment, the amount of response characteristic compensation can be calculated based on the derivative value of the steering torque.

FIG. 34 is a block diagram showing a control flow of the process executed by the controller 11 when the amount of response characteristic correction is calculated based on the derivative value of the steering torque. The control processes that are identical to the control processes of the thirteenth embodiment shown in FIG. 32 are identified by identical reference numbers, and the following description focuses on those parts of the process that are different from the thirteenth embodiment shown in FIG. 32.

In a steering direction determining part 105L, the controller 11 is configured to determine whether or not the driver steering direction matches the disturbance input direction, and the output is "1" when the directions match, whereas the output is "0" at other times. Specifically, the steering torque polarity measured by the torque sensor 5 (1 when positive, −1 when negative) and the polarity of the disturbance estimation value (1 when positive, −1 when negative) are multiplied and the result is output.

In a torque change speed calculating part 105M, the steering torque detected by the torque sensor 5 is differentiated, and the change in speed of the steering torque is calculated.

In a response characteristic correction calculating part 105N, the product of the output result of the steering direction determining part 105L and the derivative value of the steering torque is output as the response characteristic correction amount.

In this modified embodiment, since the steering torque derivative value is added to the assist current when the steering wheel is turned in the opposite direction to the application of the disturbance compensation direction in a transition between the steering holding state and the steering holding state, the assist torque is increases rapidly in accordance with the steering torque derivative value, and the steering response is improved similar to the thirteenth embodiment.

Although examples of front wheel steering assist by EPS (electrical power steering) are described in the above explained first through thirteenth embodiments, the invention is also applicable to other systems capable of steering a vehicle, such as DYC using brake traction power, independent control of all wheels, rear wheel steering and the like.

The vehicle steering apparatus of the present invention provides a pulling suppression supplemental steering force in a direction canceling a driving torque during rectilinear driving based on a driving torque history during rectilinear driving of the vehicle. Thus, both system simplification and stable suppression of veering caused by the vehicle are attained by regularly controlling the characteristics of the vehicle itself by supplemental steering force control using a long-term history without performing dynamic momentary corrections.

What is claimed is:
1. A vehicle steering apparatus comprising:
a vehicle steering system including a steering wheel configured and arranged to be operated by an operator of a vehicle and a pair of drive wheels operatively coupled to the steering wheel to selectively turn with respect to the vehicle in accordance with a steering operation of the steering wheel by the operator; and a supplemental steering force applying device configured and arranged to apply a supplemental steering force to the vehicle steering system to reduce a steering load on the operator, the supplemental steering force applying device including
- a section that detects a vehicle condition that is indicative of a rectilinear driving condition of the vehicle,
- a steering torque detecting section that detects a steering torque when the vehicle is in the rectilinear driving condition to collect historical data of the steering torque during the rectilinear driving condition, and
- a pulling suppression control section that calculates a pulling suppression force independently of the supplemental steering force based on the historical data of the steering torque during the rectilinear driving condition, and that constantly offsets the supplemental steering force by the pulling suppression force in a direction canceling a pulling force imparted on the vehicle during the rectilinear driving condition.

2. The vehicle steering apparatus according to claim 1, wherein
the section that detects the vehicle condition includes
- a steering angle detecting section configured and arranged to detect a steering angle of the steering wheel, and
- a rectilinear steering angle calculating section configured and arranged to calculate a rectilinear steering angle required to maintain the rectilinear driving condition of the vehicle,
the pulling suppression control section is further configured to control the pulling suppression force such that the steering torque at the rectilinear steering angle approaches zero.

3. The vehicle steering apparatus according to claim 2, wherein
the pulling suppression control section is further configured to adjust the pulling suppression force such that an average value of the steering angles detected by the steering angle detecting section approaches the rectilinear steering angle calculated in the rectilinear steering angle calculating section when the steering torque detected by the steering torque detecting section is less than a predetermined value close to zero.

4. The vehicle steering apparatus according to claim 2, wherein
the rectilinear steering angle calculating section is further configured to set an average value of historical data of the steering angle as the rectilinear steering angle.

5. The vehicle steering apparatus according to claim 2, wherein
the rectilinear steering angle calculating section is further configured to calculate a frequency distribution in historical data of the steering angle and to set a peak frequency steering angle in the frequency distribution as the rectilinear steering angle.

6. The vehicle steering apparatus according to claim 2, further comprising
- a yaw rate detecting section configured and arranged to detect a yaw rate of the vehicle, and
- a lateral acceleration detecting section configured and arranged to detect a lateral acceleration of the vehicle,
the rectilinear steering angle calculating section being further configured to set a steering angle detected by the steering angle detecting section when the yaw rate and the lateral acceleration are less than predetermined values close to zero as the rectilinear steering angle.

7. The vehicle steering apparatus according to claim 2, wherein
the rectilinear steering angle calculating section is further configured to set a steering angle detected by the steering angle detecting section when the steering angle has been continuously less than a predetermined value close to zero for a predetermined time as the rectilinear steering angle.

8. The vehicle steering apparatus according to claim 1, further comprising
a steering switch configured and arranged to be operated by the operator to set a steering neutral point,
the pulling suppression control section being further configured to set the steering torque detected by the steering torque detecting section when the steering switch is operated as the pulling suppression force.

9. The vehicle steering apparatus according to claim 2, further comprising
a steering wheel holding condition detecting section configured and arranged to detect a holding condition of the steering wheel by the operator,
the pulling suppression control section being further configured to control the pulling suppression force such that
- the pulling suppression control section is configured to calculate a first pulling suppression force by using a first logic such that the steering torque at the rectilinear steering angle is reduced toward zero when the operator is holding the steering wheel with a torque equal to or greater than a predetermined value, and
- the pulling suppression control section is configured to calculate a second pulling suppression force by using a second logic such that an average value of historical data of the steering angle detected when the steering torque is less than a predetermined value close to zero approaches the rectilinear steering angle when the operator is holding the steering wheel with a torque less than the predetermined value or when the operator is not holding the steering wheel.

10. The vehicle steering apparatus according to claim 9, wherein
the pulling suppression control section is configured to perform weighted-adjustment of the first pulling suppression force according to number of the historical data of the steering torque, to perform weighted-adjustment of the second pulling suppression force according to number of the historical data of the steering angle, and to calculate an average value of the first and second pulling suppression forces as the pulling suppression force.

11. The vehicle steering apparatus according to claim 9, wherein
the pulling suppression control section is further configured to calculate a frequency distribution in the historical data of the steering torque and to set a peak frequency steering torque as the first pulling suppression force.

12. The vehicle steering apparatus according to claim 9, wherein
the pulling suppression control section is further configured to calculate a frequency distribution in the historical data of the steering torque, and to perform weighted-adjustment of the first pulling suppression force in accordance with a dispersion value of the frequency distribution in the historical data of the steering torque.

13. The vehicle steering apparatus according to claim 3, wherein
the pulling suppression control section is further configured to calculate a frequency distribution in the historical data of the steering angle, and to perform weighted-adjustment of the pulling suppression force in accordance with a dispersion value of the frequency distribution in the historical data of the steering angle.

14. The vehicle steering apparatus according to claim 1, wherein
the steering torque detecting section includes at least one of a torque sensor configured and arranged to detect a steering torque imparted on a steering column and a reaction force sensor configured and arranged to detect a road reaction force.

15. The vehicle steering apparatus according to claim 14, wherein
the pulling suppression control section is further configured to determine an effectiveness of application of the pulling suppression force and to correct the pulling suppression force when the application of the pulling suppression force is found to be ineffective.

16. The vehicle steering apparatus according to claim 15, wherein
the pulling suppression control section is further configured to determine the effectiveness of the application of the pulling suppression force based on a change in vehicle behavior when the pulling suppression force is temporarily changed.

17. The vehicle steering apparatus according to claim 15, wherein
the pulling suppression control section is further configured to observe the effectiveness of the application of the pulling suppression force when the steering force imparted by the operator is smaller than a predetermined torque and the vehicle speed is lower than a predetermined speed.

18. The vehicle steering apparatus according to claim 1, wherein
the pulling suppression control section is configured to decrease the pulling suppression force as the steering torque detected by the steering torque detecting section increases in the direction canceling the pulling force imparted on the vehicle during the rectilinear driving condition.

19. The vehicle steering apparatus according to claim 18, wherein
the pulling suppression control section is configured to decrease the pulling suppression force as an absolute value of the steering torque detected by the steering torque detecting section increases.

20. The vehicle steering apparatus according to claim 1, further comprising
a steering wheel operating condition detecting section configured and arranged to detect a steering wheel operating condition by the operator,
the pulling suppression control section being further configured to decrease the pulling suppression force when the steering wheel operating condition indicates the operator operates the steering wheel in a direction that is opposite from a direction to which the pulling suppression force is imparted comparing to the pulling suppression force imparted when the operator operates the steering wheel in a same direction as the direction to which the pulling suppression force is imparted.

21. The vehicle steering apparatus according to claim 1, wherein
the pulling suppression control section is further configured to decrease the pulling suppression force as a vehicle driving speed decreases.

22. A vehicle comprising the vehicle steering apparatus according to claim 1.

23. A vehicle steering apparatus comprising:
vehicle steering means for selectively turning a driving direction of a vehicle in accordance with a steering force input from an operator of the vehicle;
supplemental steering force applying means for applying a supplemental steering force to the vehicle steering means to reduce a steering load on the operator;
steering torque detecting means for detecting a steering torque;
rectilinear driving condition detecting means for detecting a rectilinear driving condition of the vehicle; and
pulling suppression control means for calculating a pulling suppression force independently of the supplemental steering force based on historical data of the steering torque detected during the rectilinear driving condition, and for constantly offsetting the supplemental steering force by the pulling suppression force in a direction canceling a pulling force imparted on the vehicle during the rectilinear driving condition.

24. A vehicle steering method comprising:
applying a supplemental steering force to a vehicle to reduce a steering load on a steering wheel in accordance with a steering force input from an operator of the vehicle;
detecting a steering torque;
detecting a rectilinear driving condition of the vehicle; and
calculating a pulling suppression force independently of the supplemental steering force based on historical data of the steering torque detected during the rectilinear driving condition; and
constantly offsetting the supplemental steering force by the pulling suppression force in a direction canceling a pulling force imparted on the vehicle during the rectilinear driving condition.

* * * * *